(12) United States Patent
Mizoguchi et al.

(10) Patent No.: US 7,777,927 B2
(45) Date of Patent: Aug. 17, 2010

(54) OSCILLATOR DEVICE, METHOD OF DRIVING THE SAME, OPTICAL DEFLECTOR AND IMAGE DISPLAY DEVICE USING THE SAME

(75) Inventors: Yasushi Mizoguchi, Okazaki (JP); Yasuhiro Soeda, Yokohama (JP); Shinichiro Watanabe, Yamato (JP); Yasuhiro Shimada, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 278 days.

(21) Appl. No.: 12/032,246

(22) Filed: Feb. 15, 2008

(65) Prior Publication Data

US 2008/0231930 A1 Sep. 25, 2008

(30) Foreign Application Priority Data

Feb. 20, 2007 (JP) .............................. 2007-039072

(51) Int. Cl.
*G02B 26/08* (2006.01)
(52) U.S. Cl. .................................................. 359/224.1
(58) Field of Classification Search ... 359/223.1–226.1, 359/290, 291, 871, 872
See application file for complete search history.

(56) References Cited

U.S. PATENT DOCUMENTS

| 5,912,608 | A | 6/1999 | Asada | |
| 6,388,789 | B1 | 5/2002 | Bernstein | 359/198 |
| 6,894,823 | B2 | 5/2005 | Taylor et al. | 359/291 |
| 6,989,614 | B2 | 1/2006 | Mizoguchi et al. | 310/36 |
| 6,995,894 | B2 | 2/2006 | Park | 359/290 |
| 7,148,591 | B2 | 12/2006 | Mizoguchi et al. | 310/36 |
| 7,221,247 | B2 * | 5/2007 | Levitan et al. | 359/290 |
| 7,442,918 | B2 | 10/2008 | Sprague et al. | 250/234 |

FOREIGN PATENT DOCUMENTS

| JP | 2003-153518 | 5/2003 |
| JP | 2005-287254 | 10/2005 |
| KR | 2003-0050798 A | 6/2003 |

OTHER PUBLICATIONS

Notice of Allowance, Korean Patent Office, dated Nov. 30, 2009.
Kurt E. Petersen, "Silicon Torsional Scanning Mirror," IBM J. Res. Develop., vol. 24, No. 5, Sep. 1980, pp. 631-637.

* cited by examiner

*Primary Examiner*—Euncha P Cherry
(74) *Attorney, Agent, or Firm*—Fitzpatrick, Cella, Harper & Scinto

(57) ABSTRACT

An oscillator device includes a first oscillator, a second oscillator configured to support the first oscillator for torsional rotation about a first rotational axis, through a first torsion spring, a supporting member configured to support the second oscillator for torsional rotation about a second rotational axis, through a second torsion spring, the second rotational axis having a predetermined angle with respect to the first rotational axis of the first oscillator, a coil disposed in relation to the second oscillator, an electrical current applying member configured to apply an electrical current to the coil, and a magnetic field generating member configured to apply a magnetic field to the coil. The coil is localized in at least one of zones of the second oscillator being quartered by extension lines of the first and second rotational axes.

10 Claims, 25 Drawing Sheets

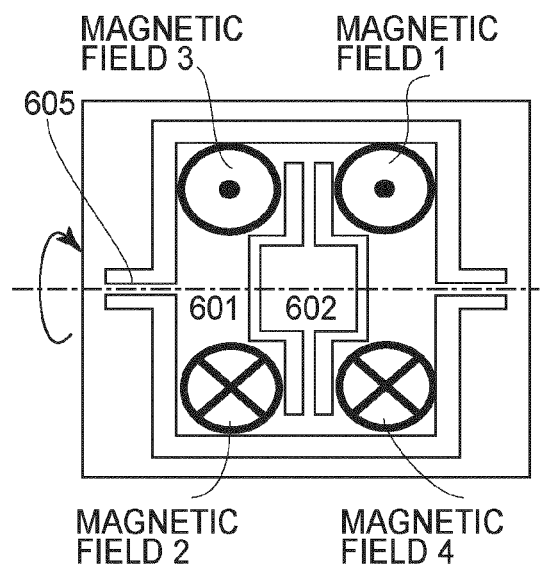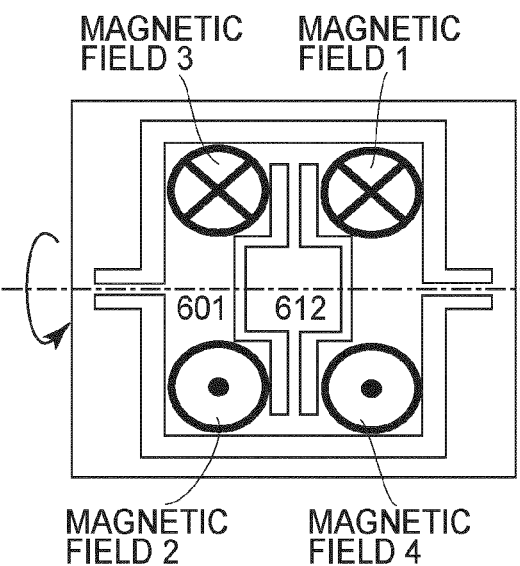
FIG.12A  FIG.12B
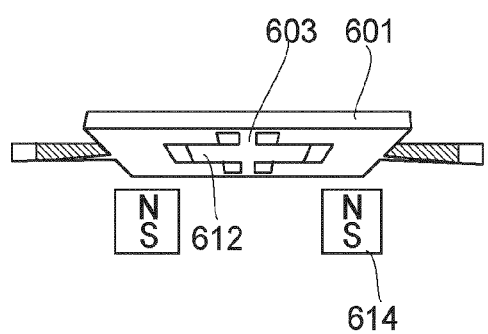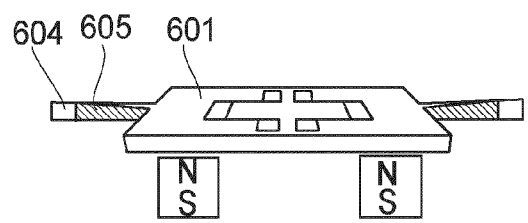
FIG.12C  FIG.12D

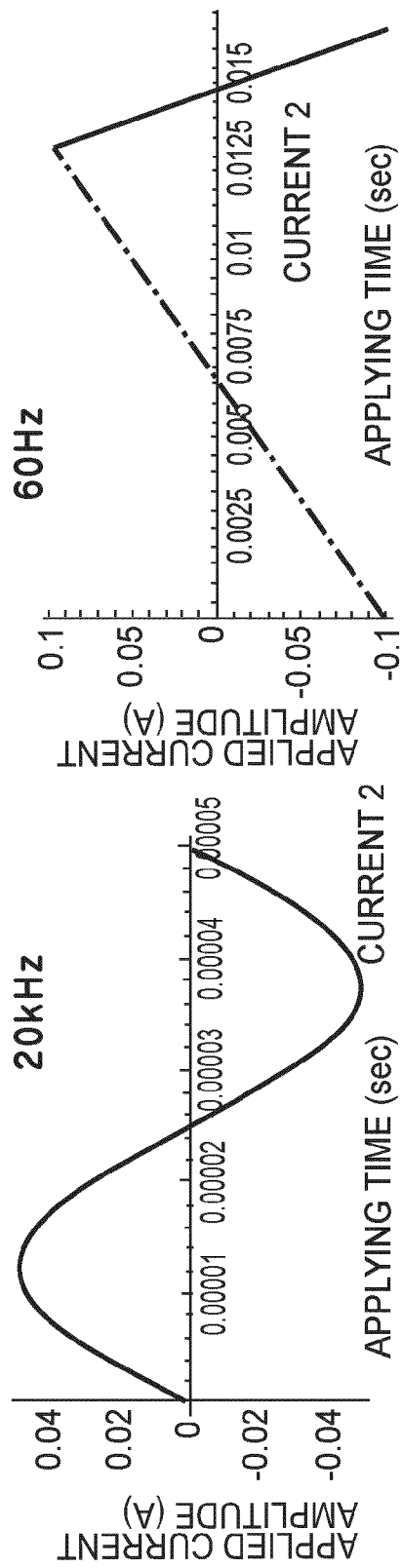
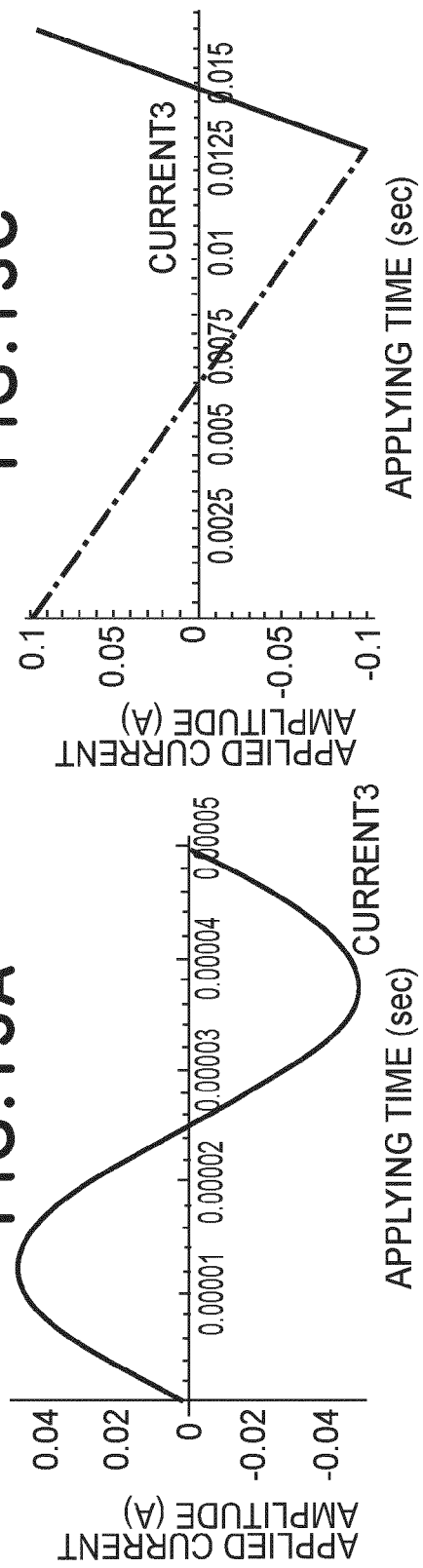

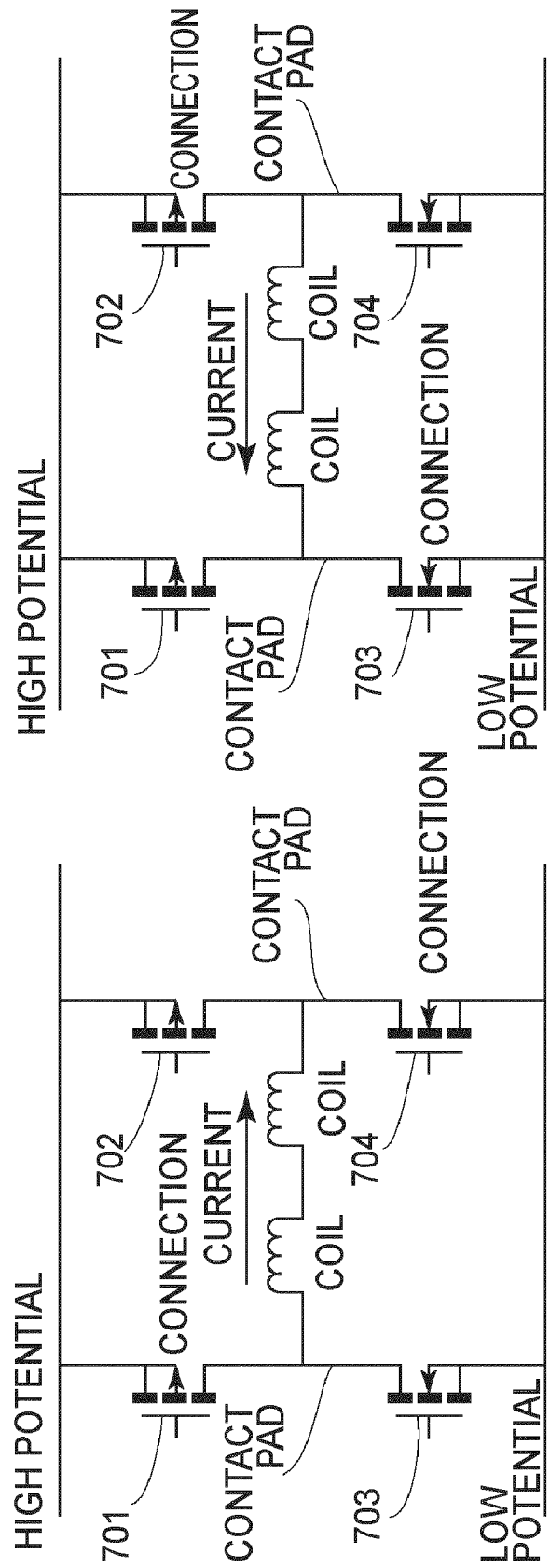

OSCILLATOR DEVICE, METHOD OF DRIVING THE SAME, OPTICAL DEFLECTOR AND IMAGE DISPLAY DEVICE USING THE SAME

This application claims priority from Japanese Patent Application No. 2007-039072, filed Feb. 20, 2007, which is hereby incorporated by reference herein.

FIELD OF THE INVENTION AND RELATED ART

This invention relates to an oscillator device having a plurality of oscillators, a method of driving the same, an optical deflector, and an image display unit using such an optical deflector. More particularly, the invention concerns an optical deflector that can be produced based on micromechanics techniques, a method of driving the same, and an image display unit using the deflector.

Optical deflectors are used to deflect a laser beam, for example. A galvano mirror is an example of a scanning mirror for scanningly deflecting a laser beam, and it is driven based on a driving principle such as follows.

When a movable coil disposed in a magnetic field is electrified, an electromagnetic force is produced due to the interaction of the electrical current and the magnetic flux, and a torque proportional to the electrical current is produced. The movable coil rotates by an angle at which this torque and a spring force are balanced. Through this movable coil, an indicating needle is oscillated and, based on this, the presence/absence or magnitude of the electrical current of the movable coil is detected. The scanning mirror, described above, is based on this principle, and a reflection mirror is provided in substitution for the needle, upon the shaft which rotates together with the movable coil.

Furthermore, there are optical deflectors that can be manufactured by using micromachining techniques, based on semiconductor manufacturing techniques, for producing a minute machine integrally on a semiconductor substrate. For example, K. E. Petersen, et al., have proposed a torsional scanning mirror made of Si (see IBM J. RES. DEVELOP., VOL. 24, No. 5, 9, 1980, pages 631-637). This optical deflector is such as shown in FIG. 22, and a mechanical moving element 3 comprises a mirror 3a as an optical deflection plate and a beam-like structure 3b for supporting the mirror 3a. Based on the electrostatic attraction that is produced by applying a drive voltage between the mirror 3a and a fixed electrode 2, which is formed on a base plate, a torsion moment is applied to the beam 3b, to cause torsional rotation of the beam 3b, thereby to change the deflection angle of the mirror 3a.

On the other hand, a scanner 10, as shown in FIG. 23, having such a structure that a mirror described above is disposed for deflective rotation around dual axes, has been proposed. (See U.S. Pat. No. 5,912,608.) In this scanner, a movable plate (movable mirror) 12B, having a mirror 16, is supported by gimbals 12A through two torsion bars 13B, and the gimbals 12A is supported by a base plate 11 through two torsion bars 13A. The rotational axes of the movable mirror and the gimbals are orthogonal to each other.

SUMMARY OF THE INVENTION

Driving coils 15A and 15B are formed at the peripheral portion of the movable mirror 12B and the gimbals 12A having such a structure, and permanent magnets 4 and 5 are placed in the same plane, while sandwiching the movable mirror and the gimbals therebetween in one diagonal direction, by which the movable mirror and the gimbals are driven.

The abovementioned galvano mirror requires a mechanically wound movable coil and a large-size yoke for producing a magnetic field. Furthermore, in the actuator shown in FIG. 23, the permanent magnets 4 and 5 are disposed in the same plane, while sandwiching the movable mirror and the gimbals therebetween. Therefore, a reduction in size is difficult to achieve.

In accordance with an aspect of the present invention, an oscillator device comprises a first oscillator, a second oscillator configured to support the first oscillator for torsional rotation about a first rotational axis, through a first torsion spring, a supporting member configured to support the second oscillator for torsional rotation about a second rotational axis, through a second torsion spring, the second rotational axis having a predetermined angle with respect to the first rotational axis of the first oscillator, a coil disposed in relation to the second oscillator, an electrical current applying member configured to apply an electrical current to the coil, and a magnetic field generating member configured to apply a magnetic field to the coil, wherein the coil is localized in at least one of zones of the second oscillator being quartered by extension lines of the first and second rotational axes.

In accordance with another aspect of the present invention, an image display device comprises a light source, an optical deflector as mentioned above and having an oscillator device, and a surface to be irradiated with light, wherein light from the light source is deflected by the oscillator device, and at least a portion of the deflected light is incident on the surface to be irradiated.

In accordance with a further aspect of the present invention, a method of driving an oscillator device is characterized in that the electrical current signal is comprised of a first driving current signal of a periodic signal having a first frequency adapted to torsionally rotate the first oscillator relative to the second oscillator, and a second driving current signal of a periodic signal having a second frequency adapted to torsionally rotate the second oscillator relative to the supporting member, and electrical currents are applied to the first coil to the fourth coil in the manner that the amount of electrical current change of the first coil to the fourth coil in response to the first driving current signal is the same, and it is taken as a current change amount 1, while the amount of electrical current change of the first coil to the fourth coil in response to the second driving current signal is the same, and it is taken as a current change amount 2, and that the amount of electrical current change of the first and second coils is taken as an addition of the current change amount 1 and the current change amount 2, while the amount of electrical current change of the third and fourth coils is taken as a subtraction of the current change amount 1 and the current change amount 2.

In accordance with the present invention, in an oscillator device, such as an optical deflector of a dual-axis driving type based on a gimbals structure, only a magnetic field producing member, such as a permanent magnet, is disposed on a surface opposed to an electrical coil. Therefore, a reduction in size is very easy to accomplish.

These and other objects, features and advantages of the present invention will become more apparent upon a consid-

BRIEF DESCRIPTION OF THE DRAWINGS

FIG. 12A-FIG. 12D are diagrams for explaining another example of a driving method in the third embodiment of the optical deflector of the present invention.

FIG. 13A-FIG. 13F are diagrams for explaining an example of a driving current in the third embodiment of the optical deflector of the present invention.

FIG. 15A and FIG. 15B are diagrams for explaining an example of a driving circuit of the optical deflector of the present invention.

DESCRIPTION OF THE PREFERRED EMBODIMENTS

Preferred embodiments of the present invention will now be described with reference to the attached drawings.

The present invention will hereafter be explained in greater detail, with reference to more specific embodiments. The embodiments to be described below concern an oscillator device of the present invention, which is applied to an optical deflector of a dual-axis drive type. However, the oscillator device of the present invention can be applied to any device where such a structure is required.

Embodiment 1

A first embodiment of the present invention will be explained with reference to several drawings.

Figure 1A:
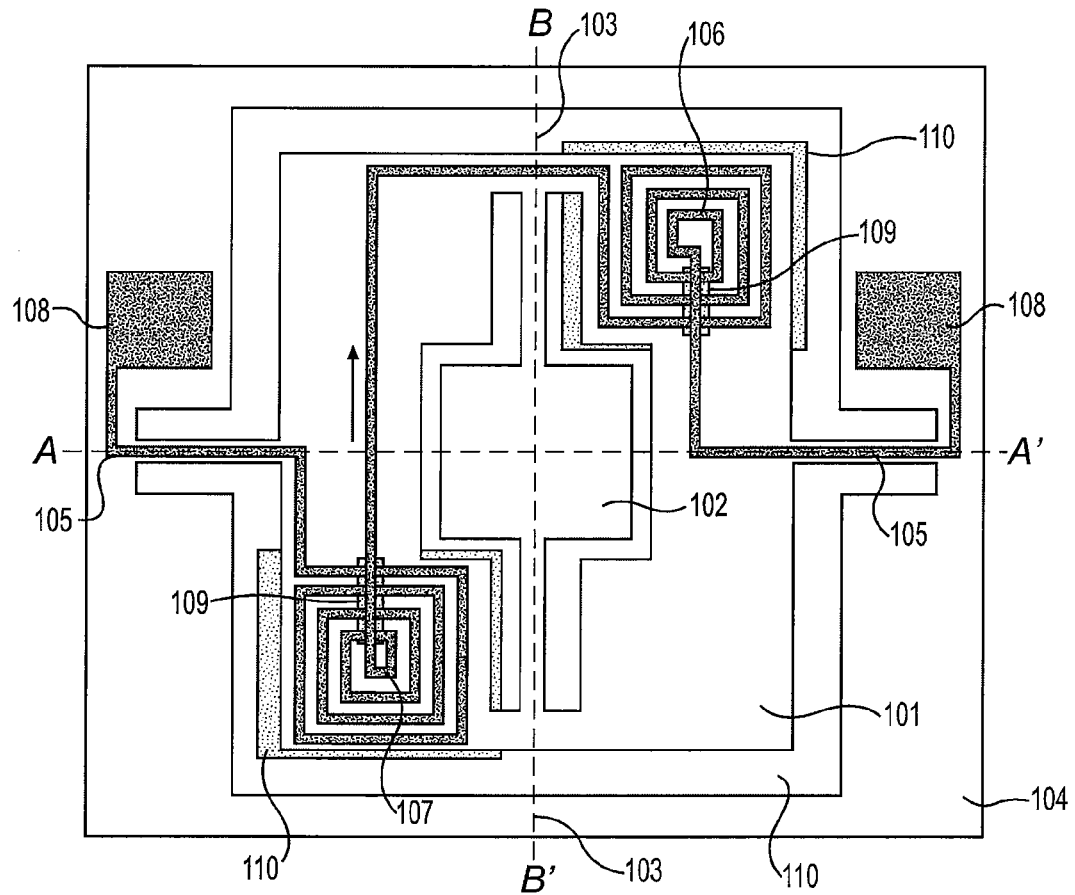
FIG. 1A and FIG. 1B are diagrams showing an example of an optical deflector according to a first embodiment of the present invention, which is an applied form of an oscillator device of the present invention.
Figure 1B:
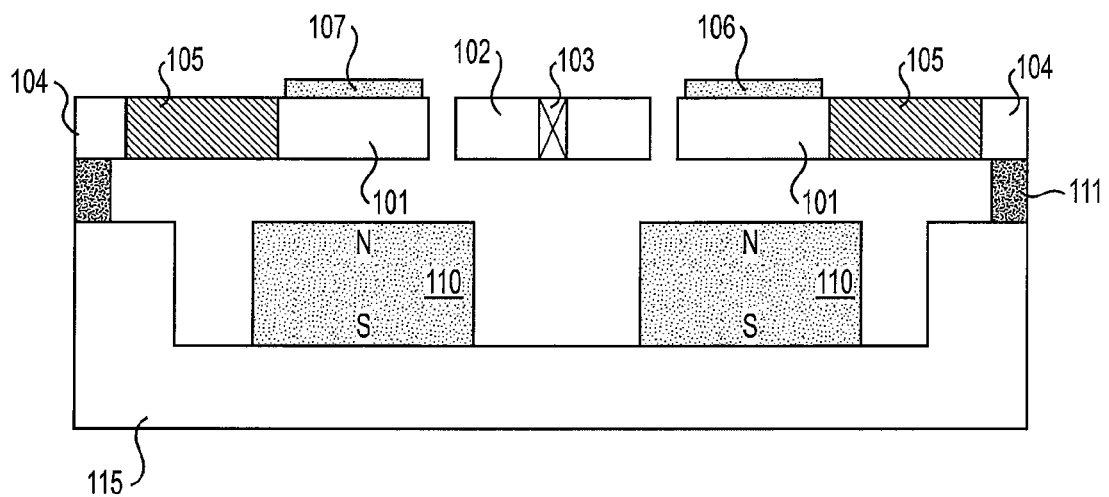
Figure 2A:
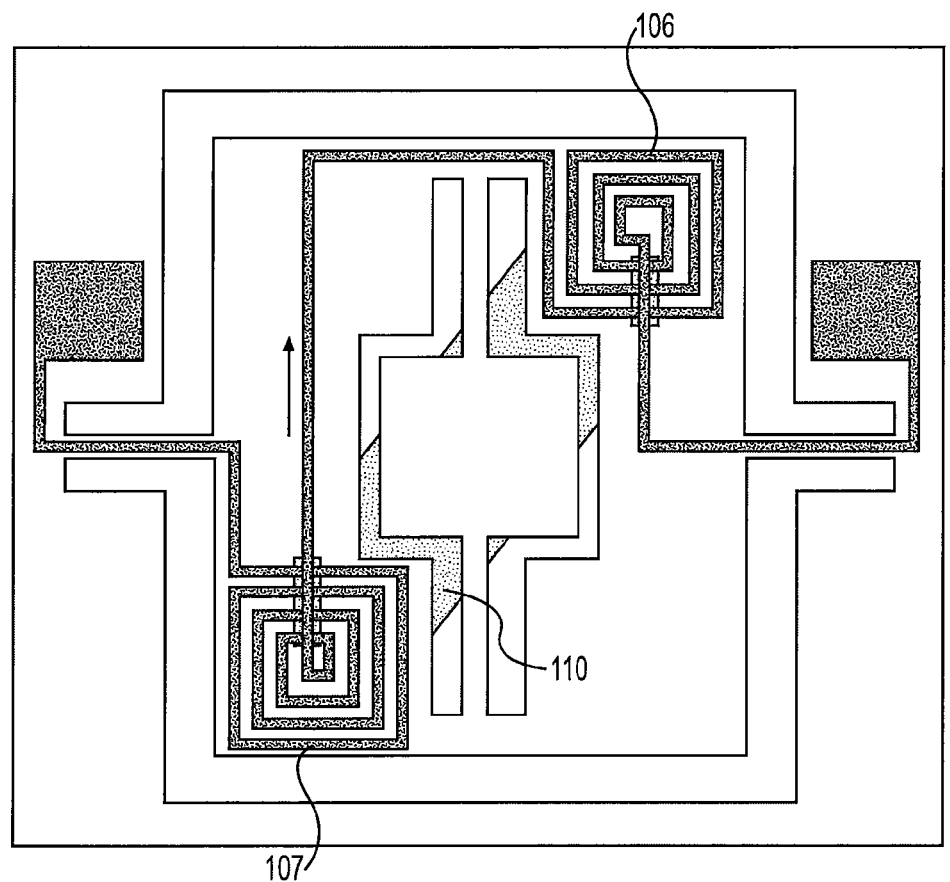
FIGS. 2A and 2B are diagrams that show a modified example of the optical deflector of FIG. 1.
Figure 2B:
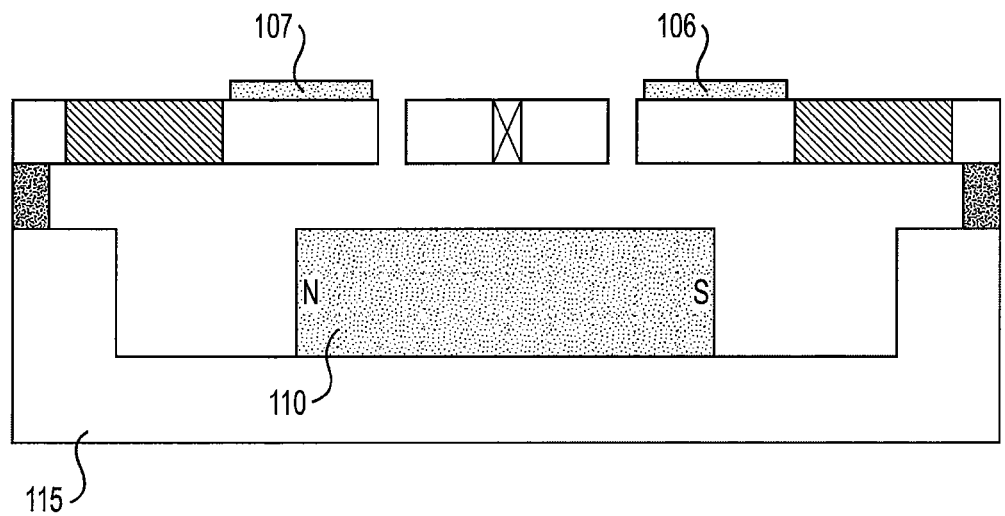
Figure 3:
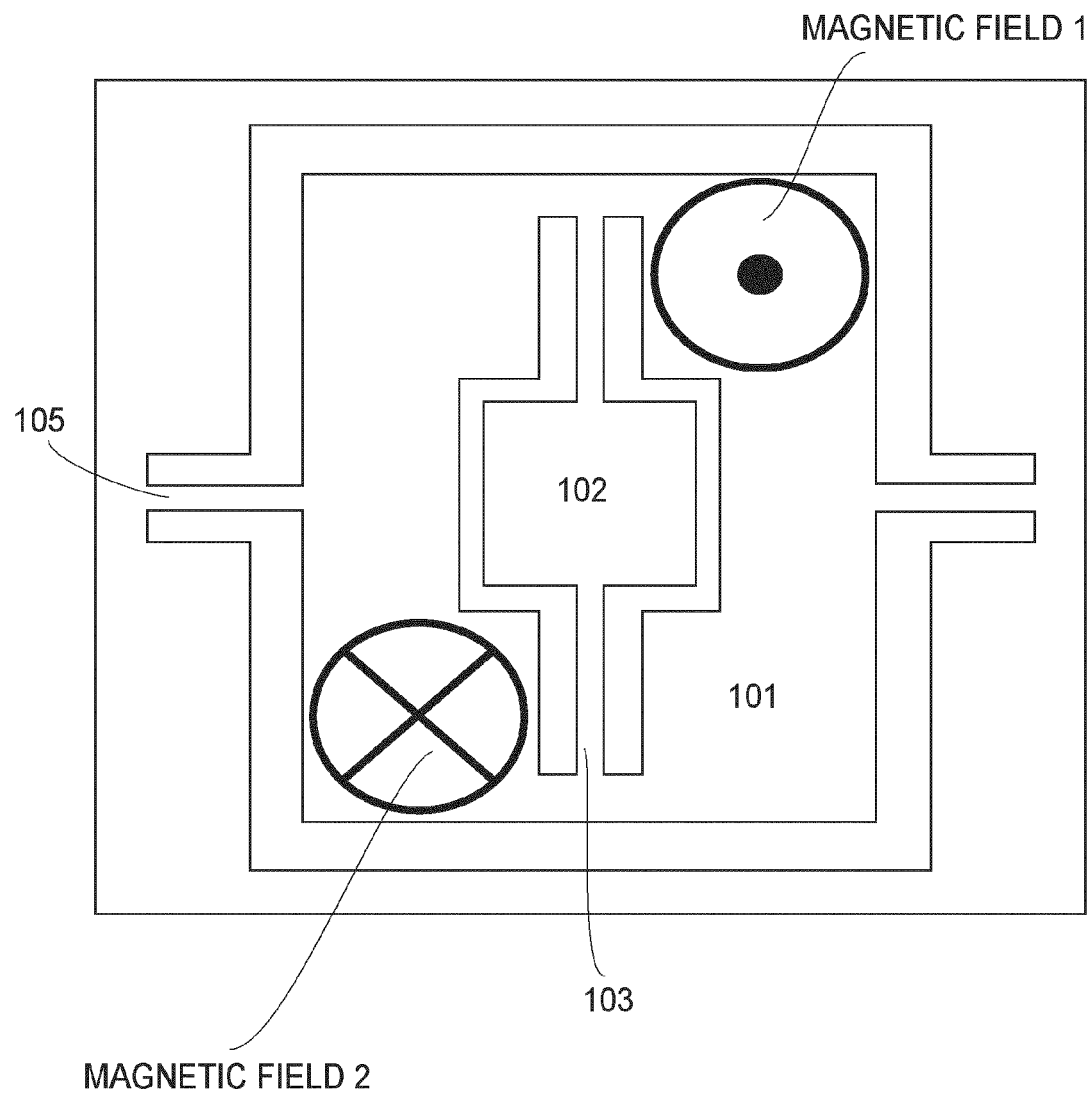
FIG. 3 is a diagram for explaining the magnetic field direction produced by an electrical coil of the first embodiment of the optical deflector shown in FIG. 1.
Figure 4A:
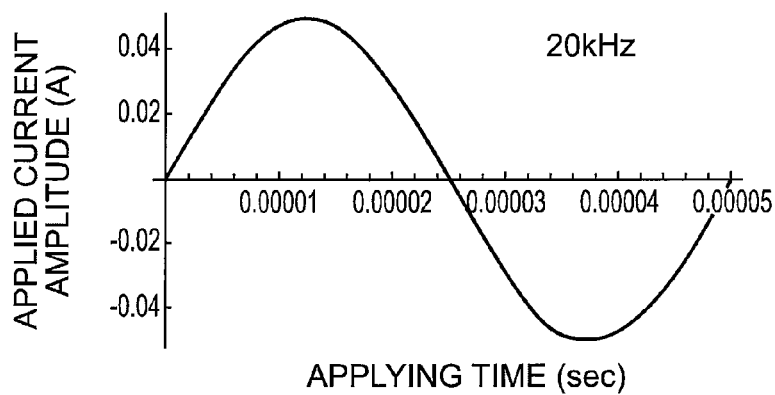
FIG. 4A, FIG. 4B and FIG. 4C are diagrams for explaining a driving current in the first embodiment of the optical deflector shown in FIG. 1.
Figure 4B:
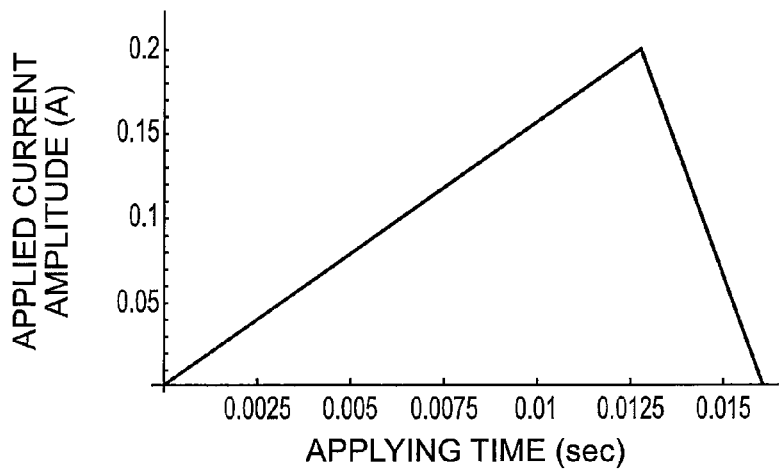
Figure 4C:
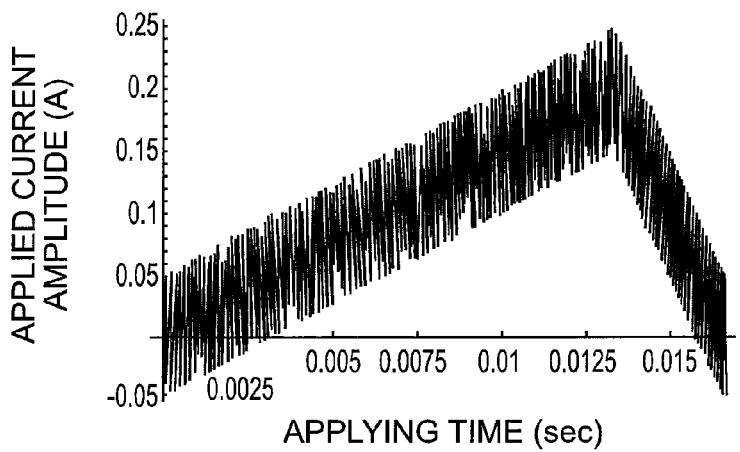
Figure 5A:
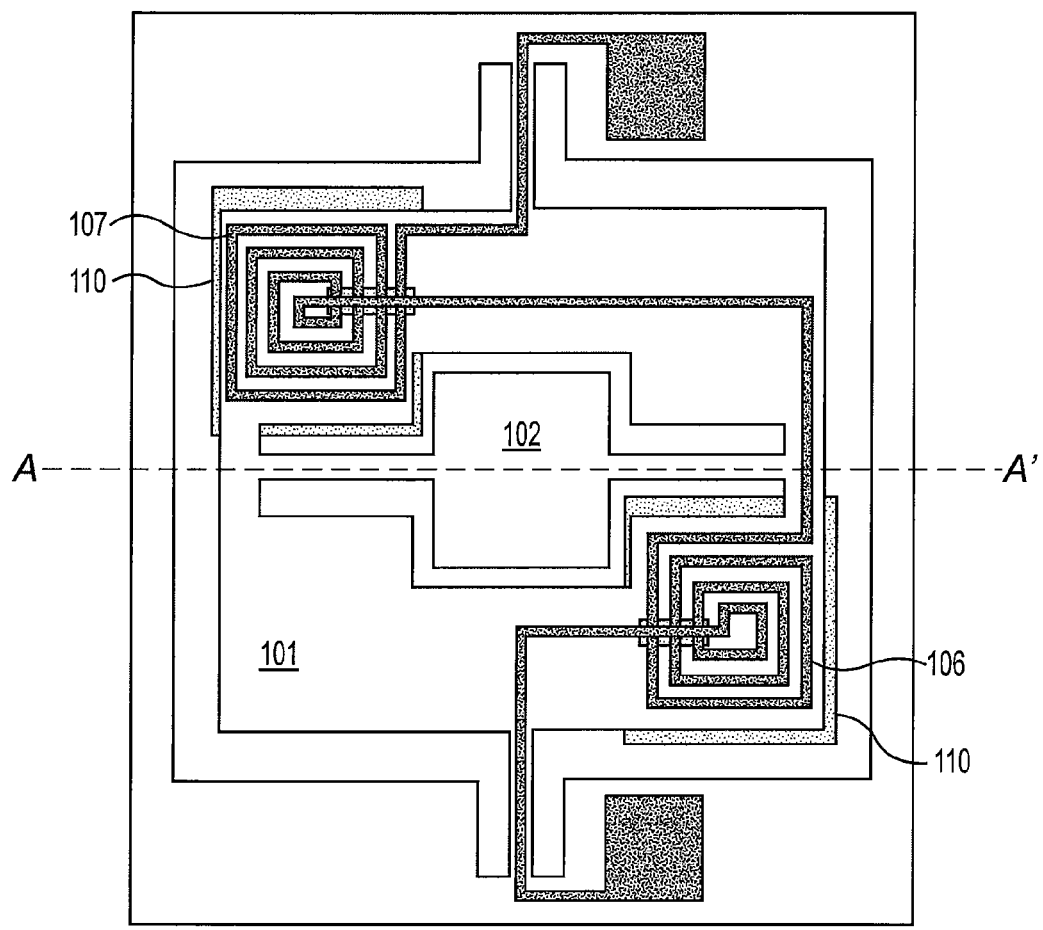
FIG. 5A-FIG. 5D are diagrams for explaining a driving method in the first embodiment of the optical deflector shown in FIG. 1.
Figure 5B:
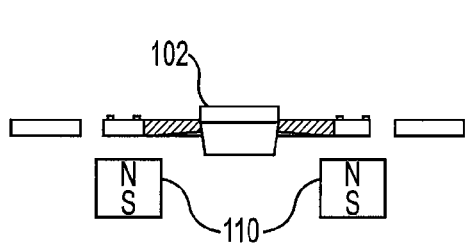
Figure 5C:
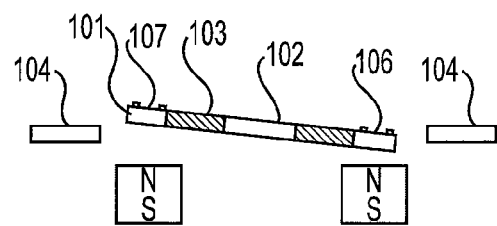
Figure 5D:
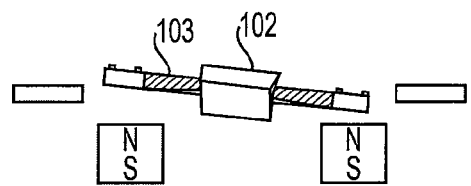

FIG. 1A and FIG. 2A are top plan views, which show the structure of a first embodiment of an optical deflector of the present invention, as well as a modified example of the same. FIG. 1B is a sectional view taken along a line A-A, showing the structure of the embodiment of FIG. 1A. FIG. 2B is a sectional view based on FIG. 2A, illustrating the structure of the modified example of FIG. 2A. FIG. 3 is a diagram for explaining the magnetic field direction that the electrical coil of the optical deflector shown in FIG. 1A and FIG. 2A produces. FIG. 4A-FIG. 4C are diagrams for explaining an electrical current signal. FIG. 5B-FIG. 5D are diagrams for explaining the driving method, using the section taken along a broken line A-A' in FIG. 5A.

The embodiment shown in FIG. 1A and FIG. 1B comprises a movable mirror 102, which is a first oscillator, a gimbals 101, which is a second oscillator, a supporting member 104, electrical coils 106 and 107 disposed on the gimbals 101, and a permanent magnet 110, which is a magnetic field producing member. An optical deflection element, such as a mirror, is provided on the movable mirror 102. The gimbals 101 supports the movable mirror 102 through a torsion bar 103 of a beam-like shape, which is a first torsion spring, for torsional rotation about a first rotational axis (shown at a broken line B-B'). The supporting member 104 supports the gimbals 101 through a torsion bar 105 of a beam-like shape, which is a second torsion spring, for torsional rotation about a second rotational axis (shown at a broken line A-A').

The permanent magnet 110 applies a magnetic field to the electrical coils 106 and 107 so as to torsionally rotate the movable mirror 102 relative to the gimbals 101, and to torsionally rotate the gimbals 101 relative to the supporting member 104. For the magnetic field generating member, an electromagnetic coil may be used.

Furthermore, the coils 106 and 107 do not wind around the movable mirror 102, and they are localized in at least one (two in this example) of the zones, which are quartered by the extension lines of the first and second rotational axes. More specifically, in a two-dimensional optical deflector having a gimbals structure mentioned above, the coils 106 and 107 are disposed on the gimbals 101 in the manner that their center positions are off the extension lines of the first and second torsion bars 103 and 105, respectively. The electrical coils 106 and 107 have their windings wound in opposite directions.

The modified example shown in FIG. 2A and FIG. 2B is different from the embodiment of FIG. 1A and FIG. 1B in the following points.

In this modified example, the magnet 110 is disposed so that one of the N pole and the S pole is placed on the magnetic field, which approximately passes through the center of the coil 106 within the magnetic field that the coil 106 generates, and that the other magnetic pole is placed on the magnetic field, which approximately passes through the center of the electrical coil 107 within the magnetic fields that the coil 107 forms. It is magnetized in the direction shown in FIG. 2B. More specifically, the S pole is at the side opposed to the electrical coil 106, and the N pole is at the side opposed to the electrical coil 107. Furthermore, the coils 106 and 107 have their windings wound in the same direction.

The structure and function of the present embodiment will be explained further. In this embodiment, the gimbals 101, movable mirror 102, first torsion bar 103, supporting member 104 and second torsion bar 105 can be formed integrally by performing a removal processing to monocrystal silicon. An insulating layer is formed between the electrical coils 106 and 107 and the gimbals 101, so that they are electrically isolated from each other. Furthermore, the electrical wirings for the coils 106 and 107 extend along the second torsion bar 105, where an insulating layer (not shown) is formed, and then they are connected to a contact pad 108 provided on the supporting member 104. There is an intermediate insulating layer 109 at the junction between the innermost winding of the coils 106 and 107 and the connecting wiring, to avoid electrical connection with the outer windings of the coil. The intermediate insulating layer 109 may be made of polyimide, for example.

Permanent magnets 110 are disposed at positions opposed to the electrical coils 106 and 107, which are formed on the gimbals 101, as described above. A plurality of electrical coils may be used and, in this embodiment, as described above, two permanent magnets are disposed in zones which are in a diagonal positional relationship with each other, sandwiching the first torsion bare 103. When plural electrical coils are used, it is necessary to consider the matching with the magnetic poles of the permanent magnets 110 placed opposed to the electrical coils 106 and 107. In a case where two permanent magnets are disposed at opposite positions sandwiching the first torsion bar 103, as shown in FIG. 1A, and the electrical coils 106 and 107 have opposite winding directions, the opposite placed permanent magnets 110 should be disposed so that they have the same magnetic pole direction (FIG. 1B).

On the other hand, if two permanent magnets are disposed at opposite directions sandwiching the first torsion bar 103, as shown in FIG. 2A, and they have the same coil winding direction, the oppositely placed permanent magnets 110 should be disposed so that they have opposite magnetic pole directions (see FIG. 2B).

As shown in FIG. 2A, if the electrical coils 106 and 107 have the same winding direction, only one permanent magnet 110 may be used, and, on that occasion, it may be disposed such as shown in FIG. 2B. In this case, it is disposed so that the magnetic poles are opposite to the electrical coils 106 and 107, respectively.

A spacer 111 is provided between the electrical coils 106 and 107, and the permanent magnet 110. Thus, even when the movable mirror 102 and the gimbals 101 torsionally rotate, the permanent magnet 111 and the movable mirror 102 do not interfere with each other. The supporting member 104 and the spacer 111, as well as the spacer 111 and the supporting base plate 115 of the permanent magnet 110, may be fixed together, respectively, by using an adhesive (not shown).

In the structure described above, when the gimbals 101 is angularly displaced by the second torsion bar 105 relative to the supporting member 104, the movable mirror 102 coupled to the gimbals 101 through the first torsion bar 103 angularly displaces in the same direction as the gimbals 101. More specifically, the movable mirror 102 is angularly displaced by the first torsion bar 103 relative to the gimbals 104, and is angularly displaced by the second torsion bar 105 relative to the supporting member 104. For example, by disposing the first torsion bar 103 and the second torsion bar 105 in approximately orthogonal directions, and by scanning the light from a light source by the movable mirror 102, a two-dimensional optical scan is accomplished.

The movable mirror 102 and the gimbals 101 are angularly displaced by the first and the second torsion bars relative to the gimbals and the supporting member, respectively, based on the electromagnetic force working between the permanent magnet and the magnetic field generated by the application of the current signals to the electrical coils 106 and 107. For example, if an electrical current 1 is applied in the direction of an arrow using the structure shown in FIG. 1A, a magnetic field 1 and a magnetic field 2, such as shown in FIG. 3, are generated in the electrical coils 106 and 107, respectively. Here, the permanent magnet 110 disposed opposed to the electrical coil 106 and the magnetic field 1 (it is in the direction toward the front of the sheet of the drawing) pull each other based on the electromagnetic force. On the other hand, the permanent magnet 110 and the magnetic field 2 (it is in the direction toward the back of the sheet of the drawing) repulse each other.

Here, an example of drive current signals applied to the electrical coils, as well as torsional rotation of the movable mirror 102 and the gimbals 101, will be explained using FIG. 4. The signals to be applied to the electrical coils 106 and 107 are an electrical current signal provided by superposing a first driving current signal and a second driving current signal on one another. The first driving current signal is one for torsionally rotating the movable mirror 102 (first oscillator) relative to the gimbals 101 (second oscillator) through the first torsion bar 103. The second driving current signal is one for torsionally rotating the gimbals 101 (second oscillator) relative to the supporting member 104.

For example, the first driving current signal may be a sinusoidal wave having a frequency approximately the same as the torsion resonance frequency of the movable mirror 102 and the first torsion bar 103, and the frequency may be set to 20 kHz, for example (see FIG. 4A). If only the first driving current signal is applied to the electrical coils 106 and 107, as shown in FIG. 5B, the movable mirror 102 makes a torsional resonance motion relative to the gimbals 101, through the first torsion bar 103. On the other hand, the second driving current signaling may be a current signal, for example, by which the angular displacement of the gimbals 101 is based on a sawtooth wave, and the frequency may be set to 60 Hz, for example (see FIG. 4B). If only the second driving current signal is applied to the electrical coils 106 and 107, as shown in FIG. 5C, the gimbals 101 makes an angular displacement relative to the supporting member 104 through the second torsion bar 105. The driving signal has a waveform provided by superposing the first driving current signal and the second driving current signal, shown in FIG. 4C, one on another. If the driving current signal is applied to the electrical coils 106 and 107, as shown in FIG. 5D, the movable mirror 102 torsionally rotates relative to the gimbals 101, while the gimbals torsionally rotates relative to the supporting member 104.

As described above, since the frequencies of the first driving current signal and the second driving current signal are sufficiently different, torsional motions of the movable mirror 102 and the gimbals 101 are activated without mixture. Furthermore, in the above-described structure, for accurate and well-balanced torsional rotations, as described, the centroids of the oscillators (movable mirror 102 and gimbals 101) are placed approximately at the point of intersection of the above-described two rotational axes. Then, because of localized configuration of the electrical coils, as described above, an electromagnetic force is generated effectively around each rotational axis, and oscillation of a desired oscillator is activated.

With the optical deflector of the structure described above, since the permanent magnet 110 is placed only on the plane opposed to the electrical coils 106 and 107, a reduction in size is easy to accomplish. Furthermore, only by applying an electrical current signal to the electrical coil formed on the gimbals 101, two-dimension angular displacement of the movable mirror 102 is accomplished. Thus, there is no need to provide a driving member, such as an electrical coil, on the movable mirror 102, and thus, the desired surface flatness of the movable mirror 102 can be maintained.

Embodiment 2

A second embodiment of the present invention will be explained below.

Figure 6:
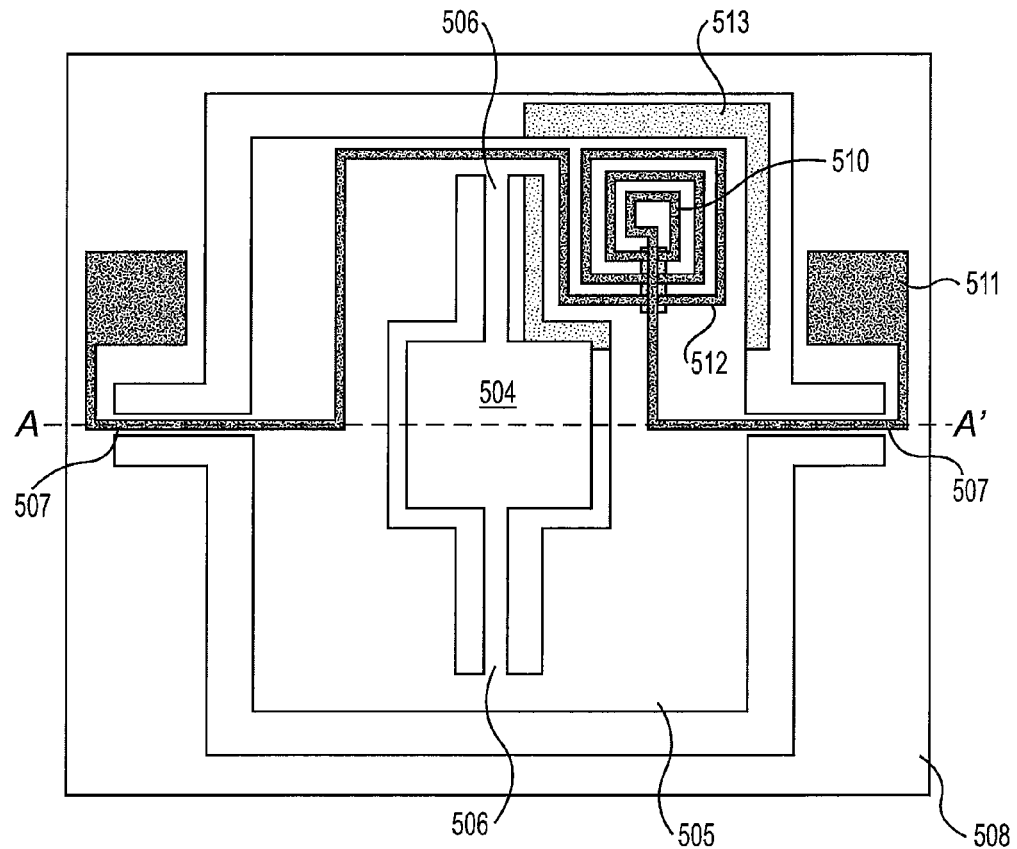
FIG. 6 is a top plan view, which shows an example of an optical deflector according to a second embodiment of the present invention.
Figure 7:
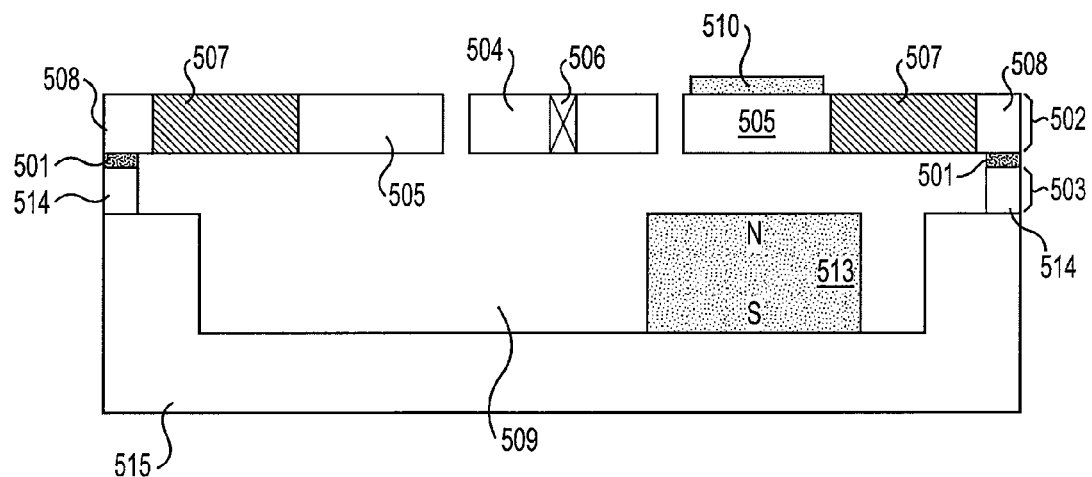
FIG. 7 is a sectional view of an optical deflector according to the second embodiment of the present invention.

The present embodiment concerns an optical deflector having a gimbals structure shown in FIG. 6 and FIG. 7. FIG. 6 is a top plan view that illustrates the structure of the optical deflector of the present embodiment, and FIG. 7 is a sectional view of the optical deflector taken along a line A-A' of FIG. 6. The present embodiment uses only one localized electrical coil 510.

In this embodiment, the optical deflector comprises an SOI substrate having an insulating layer 501 sandwiched between first and second silicon layers 502 and 503. The thickness of the first silicon layer 502 is 100 μm, and the thickness of the second silicon layer 503 is 250 μm. The movable mirror 504, gimbals 505, first torsion bar 506, second torsion bar 507 and supporting member 508 are formed by performing a removal processing to the first silicon layer 502 of the SOI substrate. There is a through-hole 509 formed in the second silicon layer 503, such that rotational motion of the movable mirror 504 and the gimbals 505 is not disturbed. The supporting member 508 is fixed to a supporting frame 514, which is formed by the second silicon layer 503, while sandwiching the insulating layer 501 therebetween. The supporting frame 514 also functions as a spacer.

In the present embodiment, as well, the gimbals 505 supports the movable mirror 504 through the first torsion bar 506, for torsional rotation. On the other hand, the supporting member 508 supports the gimbals 505 through the second torsion bar 507, for torsional rotation. The electrical coil 510, whose center position is off the extension lines of the first and second torsion bars, is provided on the gimbals 505, on which an insulating layer (not shown) is formed. The electrical wiring of the electrical coil 510 extends along the second torsion bar 507 having an insulating layer (not shown) formed thereon, and it is connected to a contact pad 511 on the supporting member 508. There is an intermediate insulating layer 512 at the junction between the innermost winding of the coil 510 and the connecting wiring, to avoid electrical connection with outer windings of the coil 510. The intermediate insulating layer 109 may be made of polyimide, for example. The permanent magnet 513 is disposed on the supporting base plate 515, at a position opposed to the electrical coil 510.

In this case, as well, the movable mirror 504 and the gimbals 505 are angularly displaced relative to the gimbals and the supporting member, respectively, by the first and second torsion bars 506 and 507, respectively, based on the electromagnetic force, which works between the magnetic field produced by the application of an electrical current signal to the electrical coil 510 and the magnetic field of the permanent magnet 513.

A driving current 1 of a sinusoidal wave is applied to the electrical coil 510, so as to produce angular displacement of the movable mirror 504 relative to the gimbals 505. The frequency of this sinusoidal wave is set at the torsion resonance frequency of the movable mirror 504 and first torsion bar 506 with respect to the gimbals 505. With this arrangement, the movable mirror 504 produces angular displacement motion having an angular displacement quantity based on a sinusoidal wave, relative to the gimbals 505. Furthermore, an electrical current signal 2 of a sawtooth waveform is applied to the electrical coil 510, so as to make gimbals 505 produce angular displacement motion relative to the supporting member 508. This drive frequency is set to 60 Hz. Here, the angular displacement of the gimbals 505 shows a sawtooth-waveform. If only the current signal 2 is applied to the electrical coil 510, since the movable mirror 504 is coupled to the gimbals 505 through the first torsion bar 506, it performs an angular displacement movement together with the gimbals and through the second torsion bar 507, relative to the supporting member 508. Furthermore, by superposing the current signal 1 and current signal 2 on one another and applying it to the electrical coil 501, two-dimensional angular displacement of the movable mirror 504 relative to the supporting member 508 is accomplished.

In the optical deflector of the structure described above, since only one permanent magnet 513 is placed at a surface opposed to a single electrical coil 510, a reduction in size is enabled. Furthermore, two-dimensional angular displacement of the movable mirror 504 is accomplished only by applying a current signal to one electrical coil 510 formed on the gimbals 505. The remaining features are similar to those of the first embodiment.

Embodiment 3

A third embodiment of the present invention will be explained.

Figure 8A:
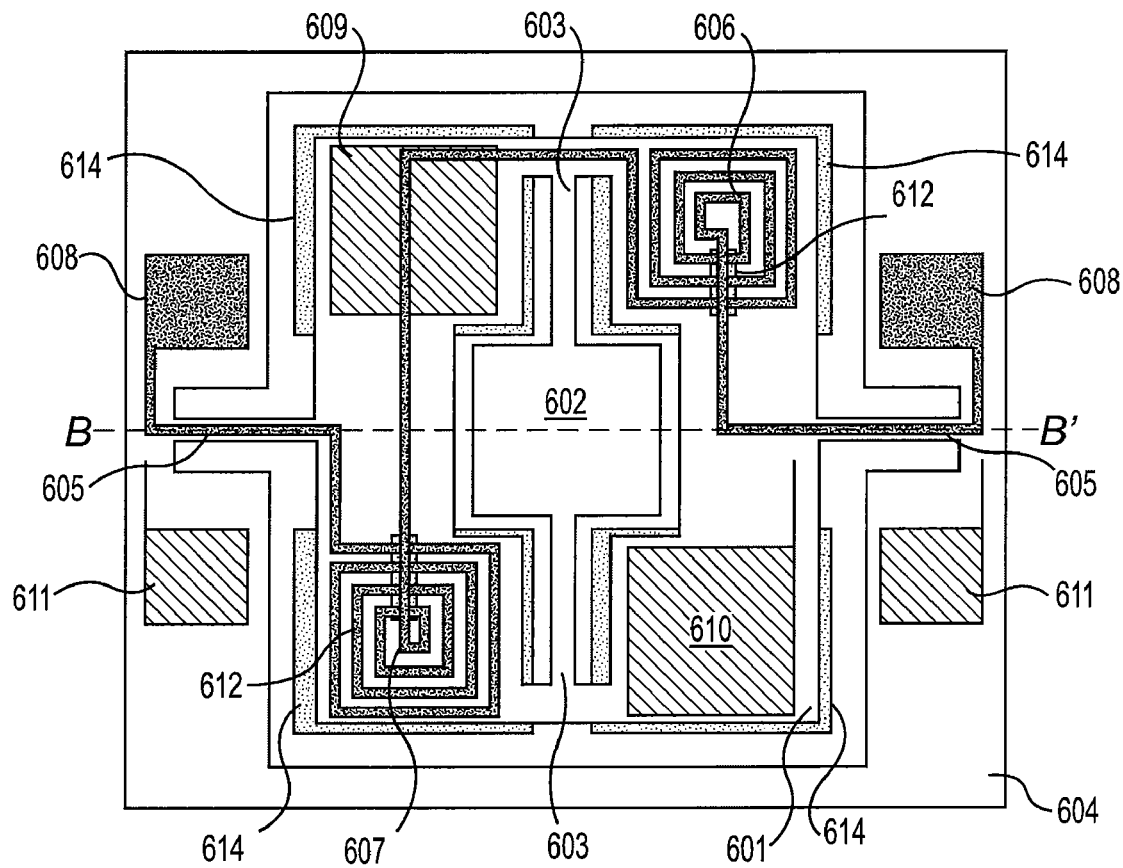
FIG. 8A, FIG. 8B and FIG. 8C are bottom views showing an example of an optical deflector according to a third embodiment of the present invention.
Figure 8B:
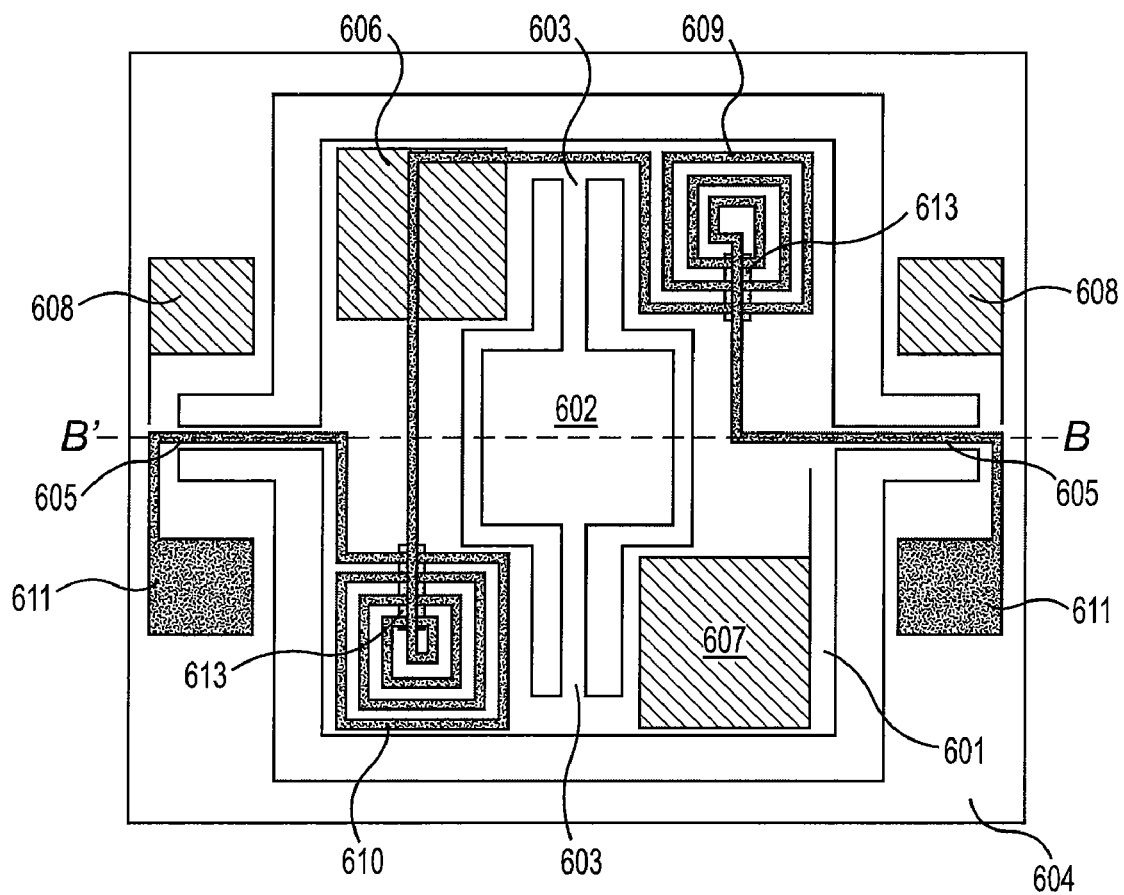
Figure 8C:
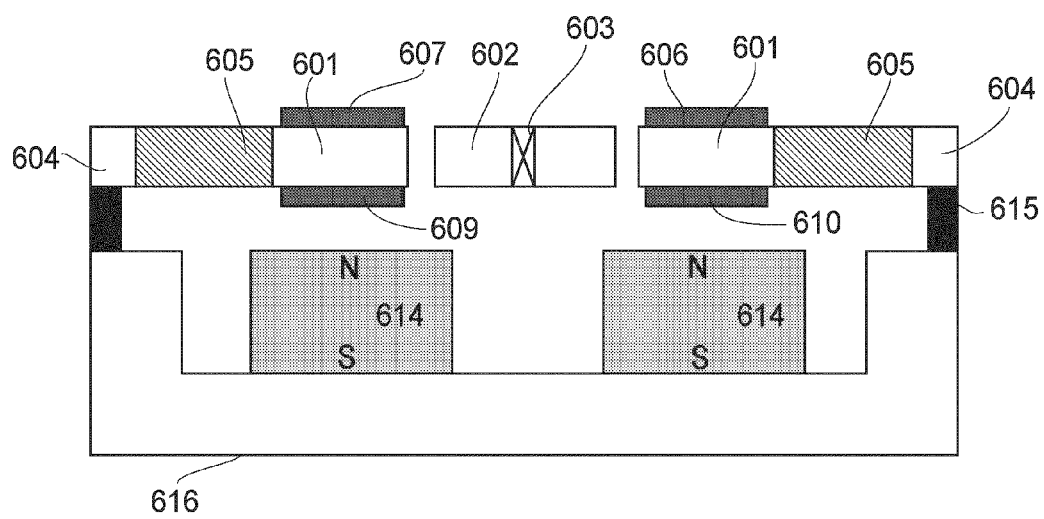
Figure 9:
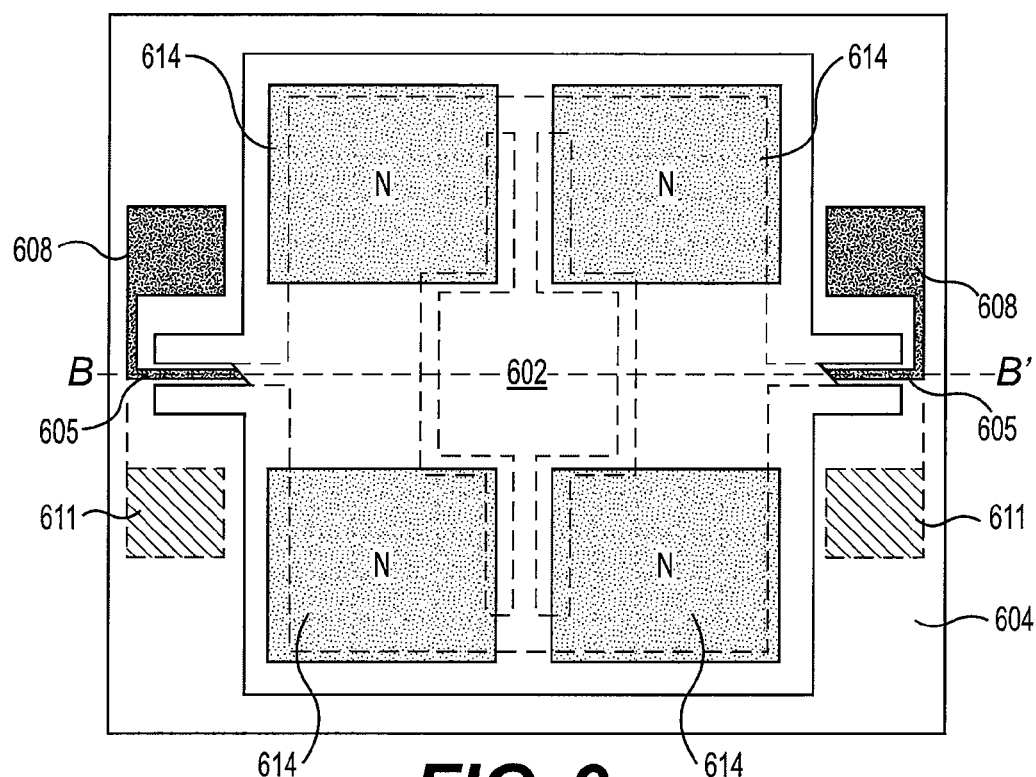
FIG. 9 is a diagram showing a disposition example of permanent magnets in the third embodiment of the optical deflector of the present invention.
Figure 10:
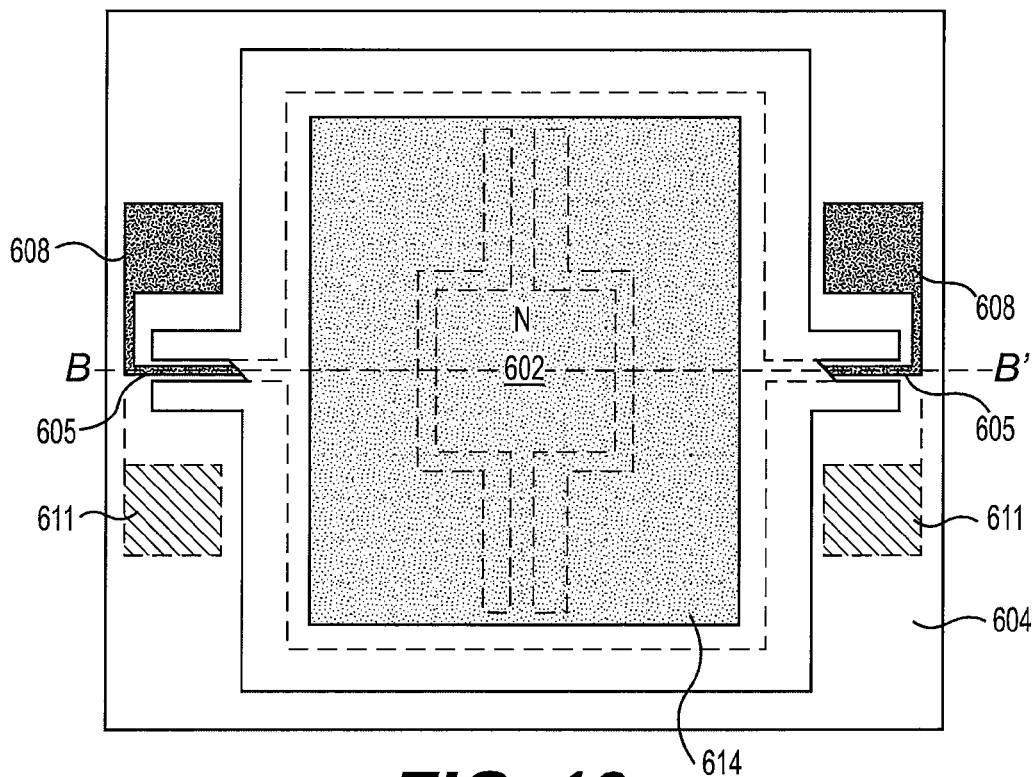
FIG. 10 is a diagram, which shows another disposition example of the permanent magnets in the third embodiment of the optical deflector of the present invention.

The present embodiment is an example of an optical deflector having a gimbals structure, shown in FIG. 8A-FIG. 8C. FIG. 8A is a top plan view that illustrates the structure of the optical deflector of the present embodiment, and FIG. 8B is a bottom view wherein some structural components are not shown. FIG. 8C is a sectional view of this optical deflector, taken along a line B-B'. FIG. 9 and FIG. 10 are top plan views, which show two disposition examples of permanent magnets, wherein some structural components are not shown. FIG. 11A-FIG. 11D and FIG. 12A-FIG. 12D are diagrams for explaining a driving method of the present embodiment. FIG. 13A-FIG. 13F are diagrams for explaining driving current signals. Furthermore, FIG. 14A and FIG. 14B are diagrams for explaining a two-dimensional scan of the optical deflector of the present embodiment, and FIG. 15A and FIG. 15B are diagrams for explaining a driving circuit, which is a current applying member of the present embodiment.

In this embodiment, the gimbals 601 supports the movable mirror 602 through the first torsion bar 603, for torsional rotation. On the other hand, supporting member 604 supports the gimbals 601 through the second torsion bar 605, for torsional rotation. The gimbals 601, movable mirror 602, first torsion bar 603, supporting member 604 and second torsion bar 605 can be formed integrally by performing a removal processing to monocrystal silicon. As shown in FIG. 8A, the first and second electrical coils 606 and 607 are so disposed on the top surface (one surface) of the gimbals 601 that their center positions are off the extension lines of the first and second torsion bars. Furthermore, as shown in FIG. 8B, the third and fourth electrical coils 609 and 610 are so disposed on the bottom surface of the gimbals 601 (the other surface) that their center positions are off the extension lines of the first and second torsion bars. As a matter of course, a suitable intermediate insulating layer may be provided, and all four electrical coils may be placed at the same surface of the gimbals 601.

An insulating layer is formed between each electrical coil and the gimbals 601. Furthermore, the electrical coils 606 and 607 are connected electrically. Further, the opposite end portions extend along the top surface of the second torsion bar 605 having an insulating layer (not shown) formed thereon, and are connected to contact pads 608 on the supporting member 604. The electrical coils 609 and 610, as well, are connected electrically, and the opposite end portions extend along the bottom surface of the second torsion bar 605 having an insulating layer (not shown) formed thereon, and are connected to contact pads 611 on the supporting member 604.

There is an intermediate insulating layer 612 at the junction between the innermost winding of the coils 606 and 607 and the connecting wiring, to avoid electrical connection with outer windings of the coil. A similar intermediate insulating layer 613 is provided on the coils 609 and 610. These intermediate insulating layers 612 and 613 may be made of polyimide, for example.

A permanent magnet 614 is disposed at a position opposed to the electrical coils formed on the gimbals 601. The electrical coils are disposed at four corners of the gimbals 601. The orientation of the magnetic poles of the permanent magnet 614 placed opposed to the electrical coils should be determined while taking into account the matching with the winding direction of the electrical coils.

As shown in FIG. 8, of the four corners of the gimbals 601, the electrical coil 606 and the electrical coil 607 are placed in a pair of zones, of the zones quartered by the extension lines of the first and second torsion bars, which pair are in a diagonal positional relationship with each other. On the other hand, the electrical coil 609 and the electrical coil 610 are placed in another pair of zones, of the quartered zones, which pair are in a diagonal positional relationship with each other. In the structure of FIG. 8, the electrical coil 606 and the electrical coil 607 have opposite winding directions, and the electrical coil 609 and the electrical coil 610, as well, have opposite winding directions. In this case, the permanent magnet 614 disposed opposed to the electrical coil 606 and the permanent magnet 614 disposed opposed to the electrical coil 607 are disposed so that they have the same magnetic pole direction. Also, the permanent magnet 613 disposed opposed to the electrical coil 609 and the permanent magnet 613 disposed opposed to the electrical coil 610 are disposed so that they have the same magnetic pole direction (FIG. 9).

In FIG. 9, all the permanent magnets 614 are placed with their N pole exposed. However, since it is sufficient that the permanent magnets 614 at the diagonally opposed corners have the same magnetic pole direction, the permanent magnets 614 at different (non-diagonal) corner positions may have different magnetic pole directions. In the case of the electrical coil disposition shown in FIG. 8A and FIG. 8B, the following is an example, other than the disposition example of the permanent magnets shown in FIG. 9.

Even one permanent magnet, such as shown in FIG. 10, may be used (while the N pole is exposed here, the S pole may be exposed). Alternatively, two permanent magnets may be disposed in parallel to each other, with their magnetization directions extending oppositely. The magnetic pole orientation and disposition of the permanent magnets, as well as the coil winding direction, can be chosen from various possible examples. Any combination may be chosen if it enables the operation to be described later.

In the present embodiment, as well, a spacer 615 is placed between the electrical coil and the permanent magnet 614. When the movable mirror 602 and the gimbals 601 make torsional rotation, the permanent magnet 614 and the movable mirror 602 do not interfere with each other. The supporting member 604 and the spacer 615, as well as the spacer 615 and the supporting base plate 616 of the permanent magnet 614, may be fixed together, respectively, by using an adhesive (not shown).

The movable mirror 602 and the gimbals 601 are angularly displaced by the first and the second torsion bars relative to the gimbals 601 and the supporting member 604, respectively, based on the electromagnetic force working between the permanent magnet 614 and the magnetic field generated by the application of the current signals to the electrical coils.

The function and operation of the present embodiment will be explained.

Figures 11A, 11B:
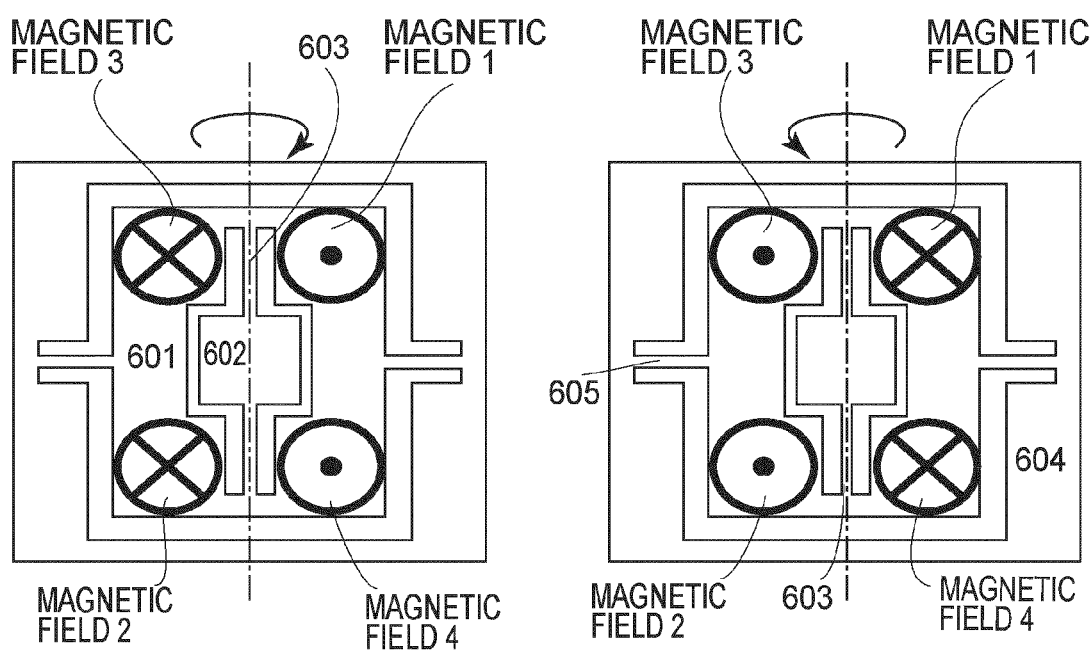
FIG. 11A-FIG. 11D are diagrams for explaining an example of a driving method in the third embodiment of the optical deflector of the present invention.
Figure 11C:
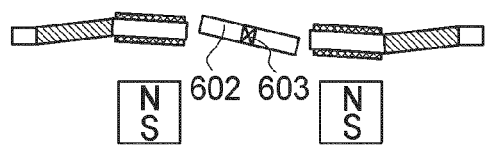
Figure 11D:
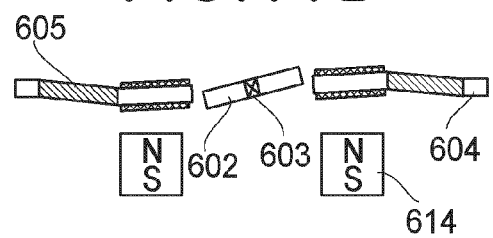

In the present embodiment, shown in FIG. 8, when an electrical current 2 and an electrical current 3 are applied in the positive direction shown by an arrow, magnetic fields 1-4, such as shown in FIG. 11A, are generated in the electrical coils 606, 607, 609 and 610. Here, the permanent magnets 614 placed at the positions opposed to the electrical coils and the magnetic fields 1 and 4 pull each other due to the electromagnetic force. Furthermore, the permanent magnets 614 and magnetic fields 2 and 3 repulse each other. Thus, as shown in FIG. 11C. a torsional rotational force in the direction of an arrow around the axis of the first torsion bar 603 acts on the movable mirror 601 and the gimbals 602, so that they are angularly displaced. For a similar reason, when electrical currents 2 and 3 are applied in a direction opposite to the arrow, magnetic fields 1-4, such as shown in FIG. 11B, are generated, and a torsional rotation force in the direction opposite to that shown in FIG. 11C acts to cause angular displacement, as shown in FIG. 11D.

Furthermore, in this embodiment, when the electrical current 2 is applied in the direction of the arrow, while the electrical current 3 is applied in the direction opposite to the arrow, magnetic fields 1-4, such as shown in FIG. 12A, are generated in the electrical coils 606, 607, 609 and 610. Here, the permanent magnets 614 placed at positions opposed to the electrical coils, and the magnetic fields 1 and 3, pull each other due to the electromagnetic force and, on the other hand, the permanent magnets and the magnetic fields 2 and 4 repulse each other. Thus, as shown in FIG. 12C, a torsional rotational force in the direction of an arrow around the axis of the second torsion bar 605 acts on the movable mirror 601 and the gimbals 602, so that they are angularly displaced. For a similar reason, when electrical current 2 is applied in the opposite direction to the arrow, while electrical current 3 is applied in the positive direction of the arrow, magnetic fields 1-4, such as shown in FIG. 12B, are generated, and a torsional rotational force in the direction opposite to that shown in FIG. 12C acts, to cause an angular displacement, as shown in FIG. 12D.

Here, an example of the driving signal will be explained, with reference to FIG. 13.

The signals to be applied to the electrical coils 106 and 107 are an electrical current signal provided by superposing a first driving current signal and a second driving current signal on one another. The first driving current signal is one for torsionally rotating the movable mirror 601 (first oscillator) relative to the gimbals 602 (second oscillator) through the first torsion bar. The second driving current signal is one for torsionally rotating the gimbals 602 (second oscillator) relative to the supporting member 604.

In the embodiment shown in FIG. 8, the first driving current signal concerns a case where the electrical currents 2 and 3 are applied in the positive direction of an arrow, or in the opposite direction. The second driving current signal concerns a case where one of the electrical currents 2 and 3 is applied in the positive direction of the arrow, while the other is applied in the opposite direction. If the first driving current signal or the second driving current signal changes periodically, the first driving current signal corresponds to the same-phase electrical current component (FIG. 13A and FIG. 13B) of the current 2 and current 3, and the second driving current signal corresponds to the opposite-phase current component of the current 2 and current 3 (FIG. 13C and FIG. 13D).

Then, the first driving current signal may be a sinusoidal wave having a frequency approximately the same as the torsion resonance frequency of the movable mirror and the first torsion bar, and the frequency may be set to be 20 kHz, for example (see FIG. 13A). If only the first driving current signal is applied to the electrical coils, as shown in FIG. 11, the movable mirror 602 makes torsional resonance motion relative to the gimbals 601, through the first torsion bar 103. On the other hand, the second driving current signal may be a current signal, for example, by which the angular displacement of the gimbals is based on a sawtooth wave, and the frequency may be set to be 60 Hz, for example (see FIG. 13C and FIG. 13D). If only the second driving current signal is applied to the electrical coils, as shown in FIG. 12, the gimbals 601 makes an angular displacement relative to the supporting member 604 through the second torsion bar 605.

Figure 13E:
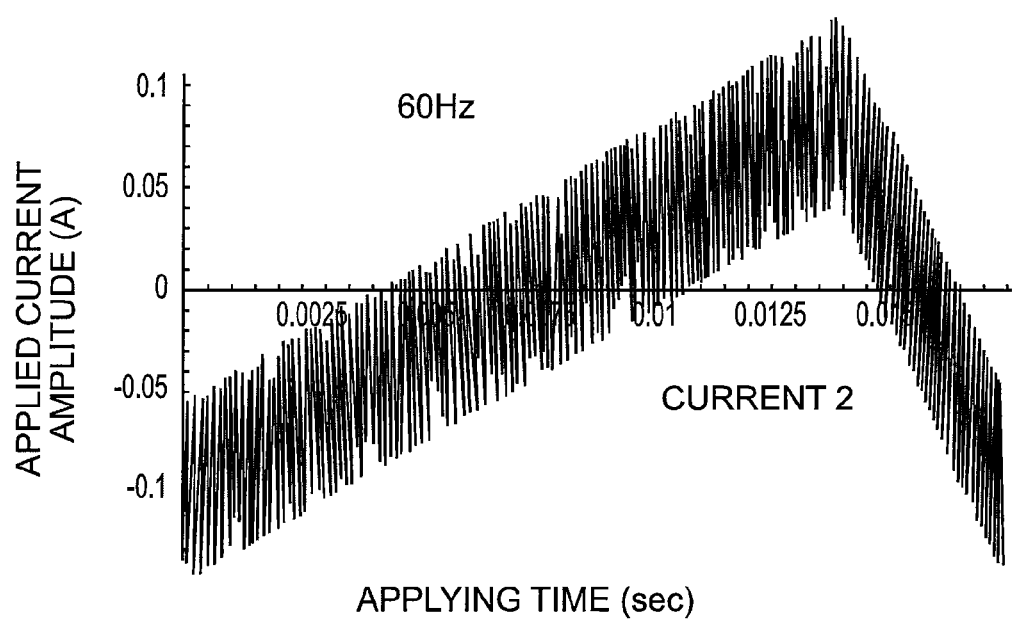
Figure 13F:
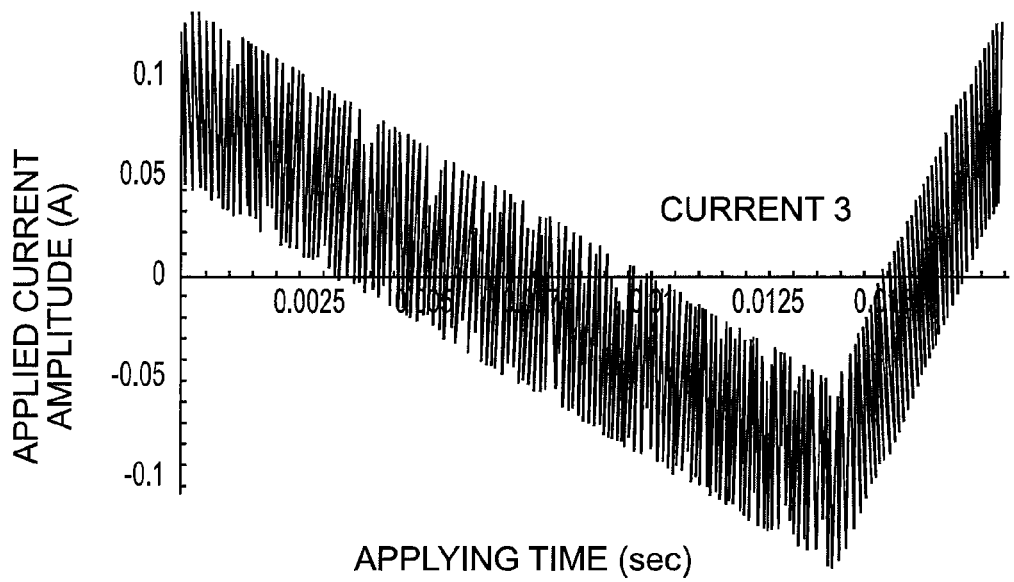
Figure 14A:
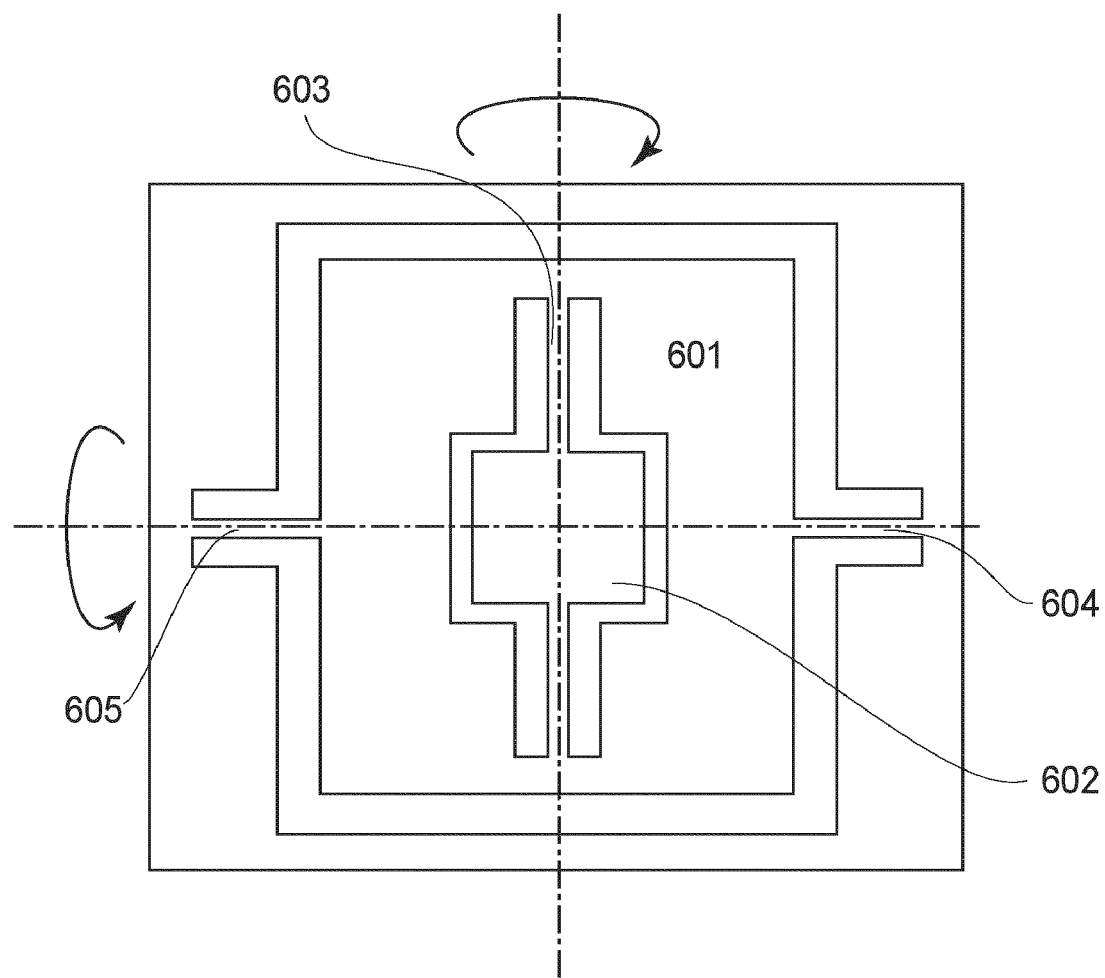
FIG. 14A and FIG. 14B are diagrams for explaining an example of a two-dimensional scan in the third embodiment of the optical deflector of the present invention.
Figure 14B:
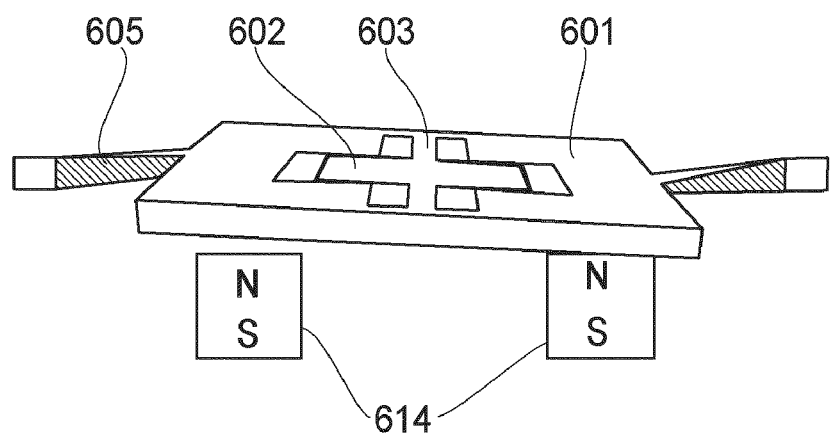

The driving signal has a waveform provided by superposing the first driving current signal and the second driving current signal, shown in FIG. 13E and FIG. 13F, on one another. Here, as shown in FIG. 14A and FIG. 14B, the movable mirror 602 torsionally rotates relative to the gimbals 601, while the gimbals 601 torsionally rotates relative to the supporting member 604.

The circuitry shown in FIG. 13 for applying an electrical current may be an H bridge circuit (FIGS. 15A and 15B), for example. The H bridge circuit may comprise transistors 701 and 702 for connecting the end node (contact pad) of the electrical coil to the high-voltage side, and transistors 703 and 704 for connecting the end node (contact pad) of the electrical coil to the low voltage side. The direction and magnitude of the electrical current flowing through the coil can be adjusted by the operation of the transistors 701-704. For example, as shown in FIG. 15A, if the transistor 701 is connected to the high-voltage side and the transistor 704 is connected to the low voltage side, the electrical current of the electrical coil increases in the direction of the arrow. On the other hand, as shown in FIG. 15B, if the transistor 703 is connected to the low voltage side and the transistor 702 is connected to the high-voltage side, the electrical current of the electrical coil increases in the opposite direction to the case of FIG. 15A. Thus, by changing the rate of time in FIG. 15A and FIG. 15B, the direction and magnitude of the electrical current flowing through the coil can be adjusted. In the embodiment shown in FIG. 8, an H bridge circuit, shown in FIGS. 15A and 15B, may be connected to the contact pads 608 and 611.

A modified example of the optical deflector having a gimbals structure shown in FIG. 8 may be a structure wherein the electrical coils 606 and 607 and the electrical coils 609 and 610 are not electrically connected to each other. In such a structure, an H bridge circuit shown in FIGS. 15A and 15B may be provided at each end node of the electrical coils 606, 607, 609 and 610. Such a circuit, which is an electrical current applying member, may be used in other embodiments.

The driving method of the oscillator device described above may be as follows.

The electrical current signal described above is comprised of a first driving current signal of a periodic signal having a first period (e.g., 20 kHz) and a second driving current signal of a period signal having a second period (e.g., 60 Hz). Then, the amount of electrical current changes of the first to fourth electrical coils by the first driving current signal is the same, and this is referred to as a "current change amount 1". The amount of electrical current changes of the first to fourth electrical coils by the second driving current signal is the same, and this is referred to as "current change amount 2". Based on this assumption, electrical currents are applied to the first to fourth coils, while the electrical current change amount of the first and second electrical coils is taken as the addition of the current change amount 1 and the current change amount 2, and the electrical change amount of the third and fourth electrical coils is taken as the subtraction of the current change amount 1 and the current change amount 2.

In the optical deflector of the present embodiment, the permanent magnet is placed only at the surface opposed to the electrical coil, and thus, a reduction in size is easy. Furthermore, the torsional rotary force can be produced independently of the dual rotational axes, and the orientation of the torsional rotation force coincides with the direction of torsion of the rotary axis. Thus, there is no loss of the torsional rotating force. Furthermore, in this embodiment as well, two-dimensional angular displacement of the movable mirror is accomplished only by applying an electrical current signal to the coil provided on the gimbals. Therefore, it is not necessary to provide a driving member, such as an electrical coil on the movable mirror, and thus, good surface flatness of the movable mirror is assured.

Embodiment 4

A fourth embodiment of the present invention will be explained.

Figure 16A:
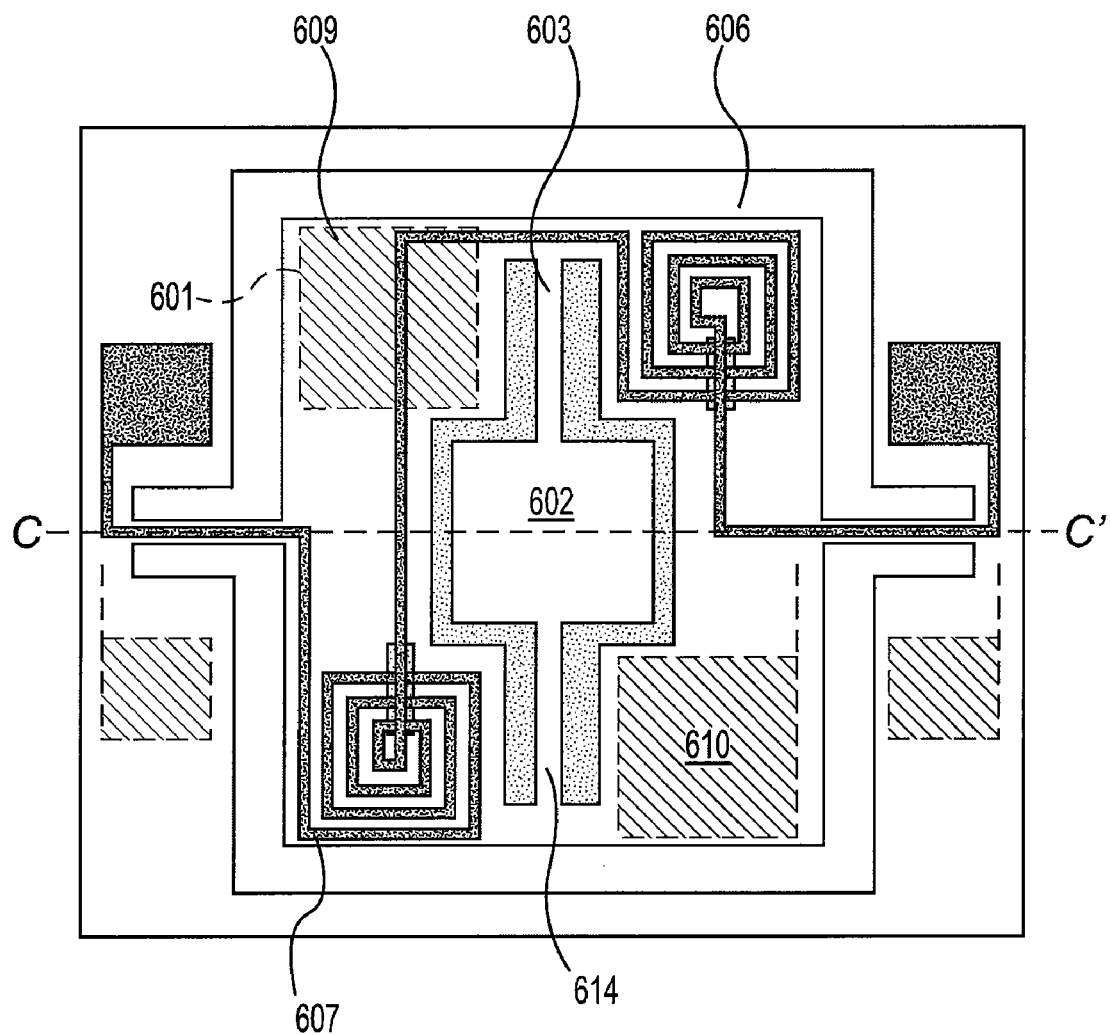
FIG. 16A, FIG. 16B and FIG. 16C are diagrams showing an example of an optical deflector according to a fourth embodiment of the present invention.
Figure 16B:
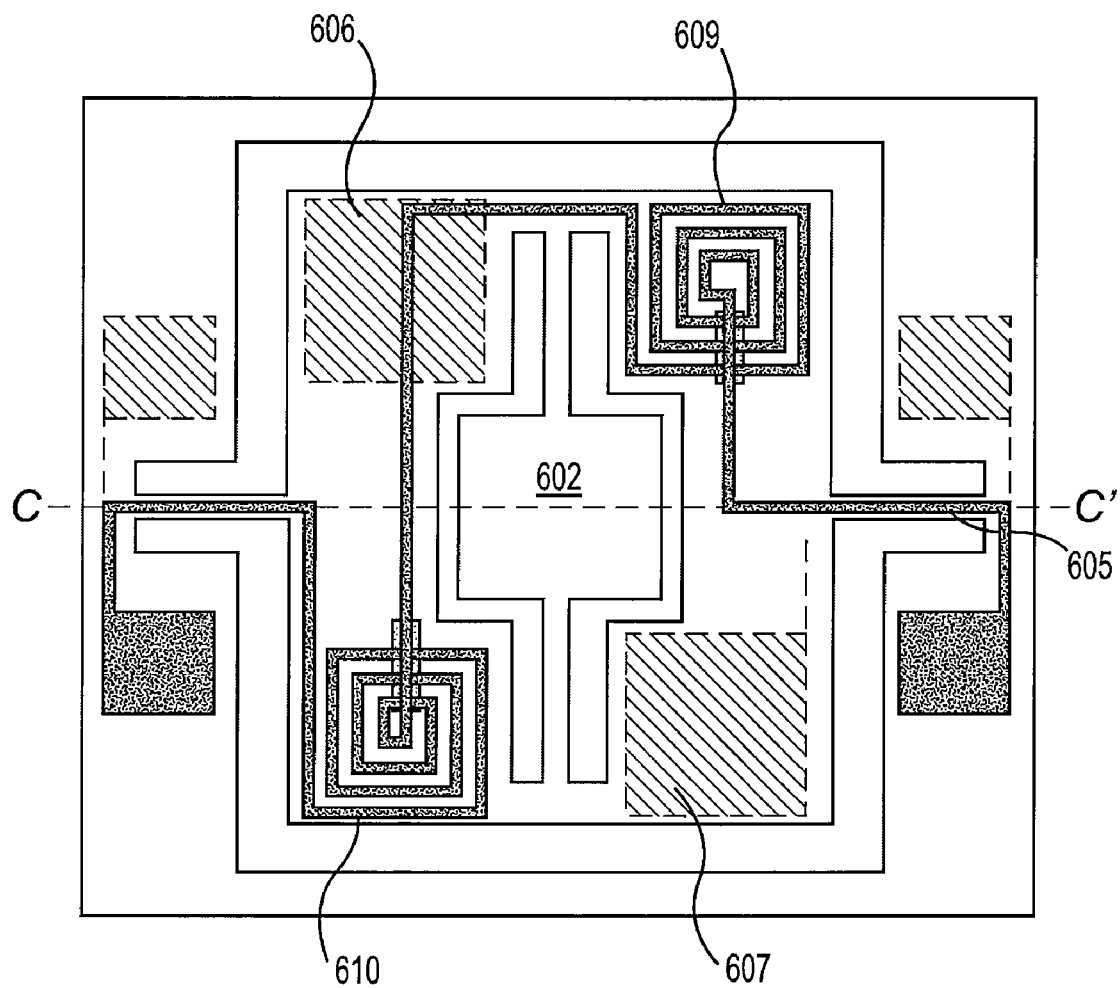
Figure 16C:
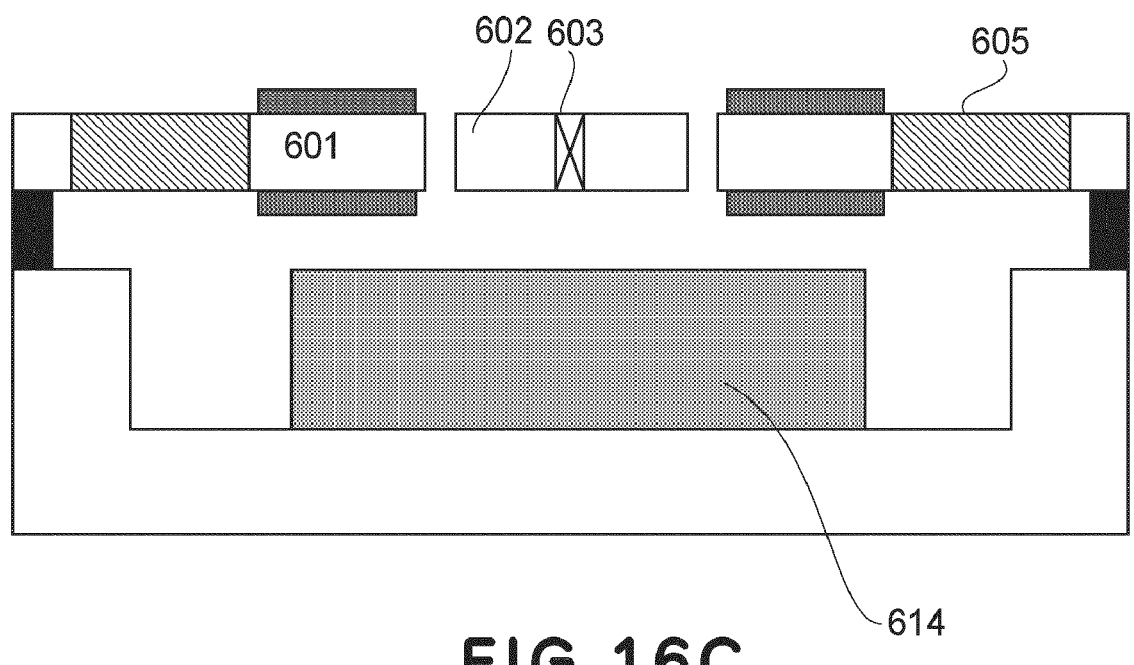
Figure 17:
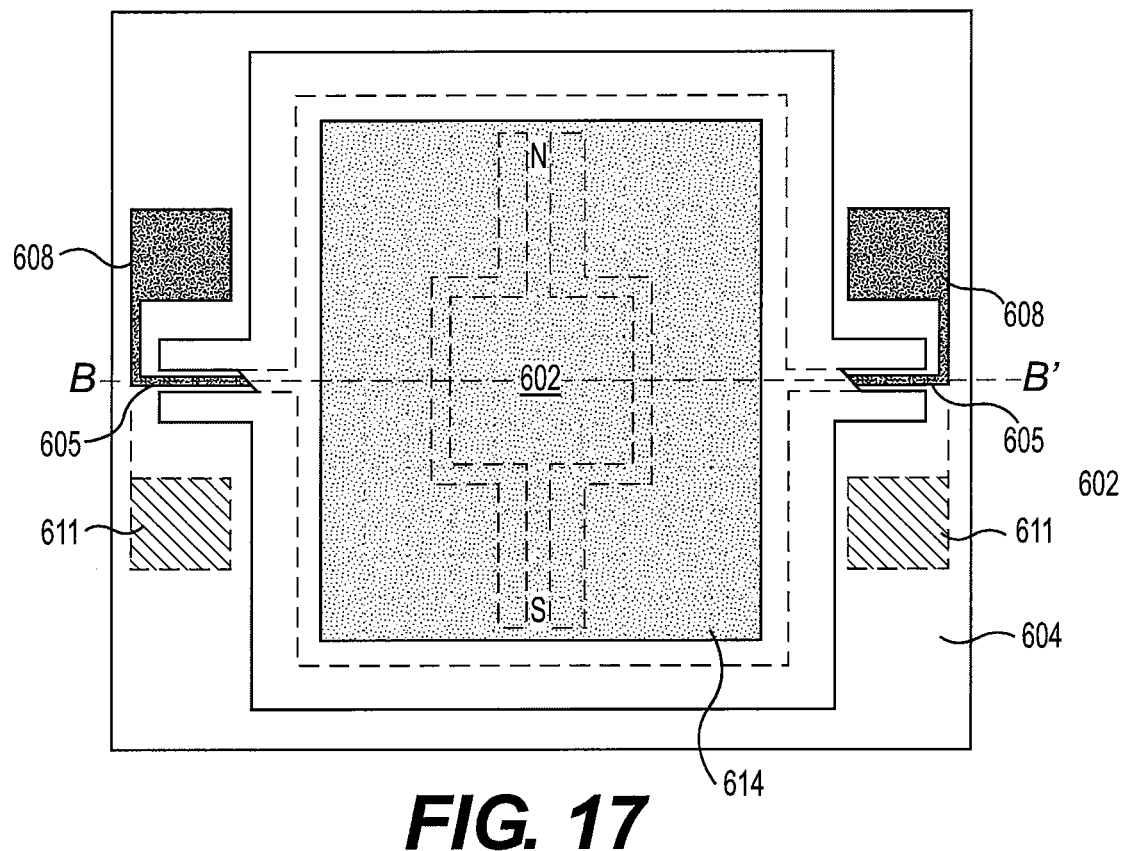
FIG. 17 is a diagram showing a disposition example of permanent magnets in the fourth embodiment of the optical deflector of the present invention.

The present embodiment is an example of an optical deflector having a gimbals structure shown in FIG. 16A-FIG. 16C. FIG. 16A is a top plan view illustrating the structure of an optical deflector of the present embodiment, and FIG. 16B is a bottom view wherein some structural components are not shown. FIG. 16C is a sectional view of the optical deflector of FIG. 16A, taken along a line C-C'. FIG. 17 is a top plan view showing an example of permanent magnet disposition, wherein some structural components are not shown.

In this embodiment, as shown in FIG. 16A-FIG. 16C, of the four corners of the gimbals 601, the electrical coil 606 and the electrical coil 607 are placed in a pair of zones, which are in a diagonal positional relationship with each other. On the other hand, the electrical coil 609 and the electrical coil 610 are placed in another pair of zones, which are in a diagonal positional relationship with each other. The electrical coil 609 and the electrical coil 610, as well, have windings being wound in the same direction. Thus, the permanent magnet disposed opposed to the electrical coil 606 and the permanent magnet disposed opposed to the electrical coil 607 are disposed so that they have opposite magnetic pole directions.

Also, the permanent magnet disposed opposed to the electrical coil 609 and the permanent magnet disposed opposed to the electrical coil 601 are disposed so that they have opposite magnetic pole directions.

In the case wherein the coils have the same winding direction, only one permanent magnet may be used and, as an example, it may be disposed such as shown in FIG. 17. The remaining features are similar to those in the third embodiment.

Embodiment 5

A fifth embodiment of the present invention will be explained.

Figure 18:
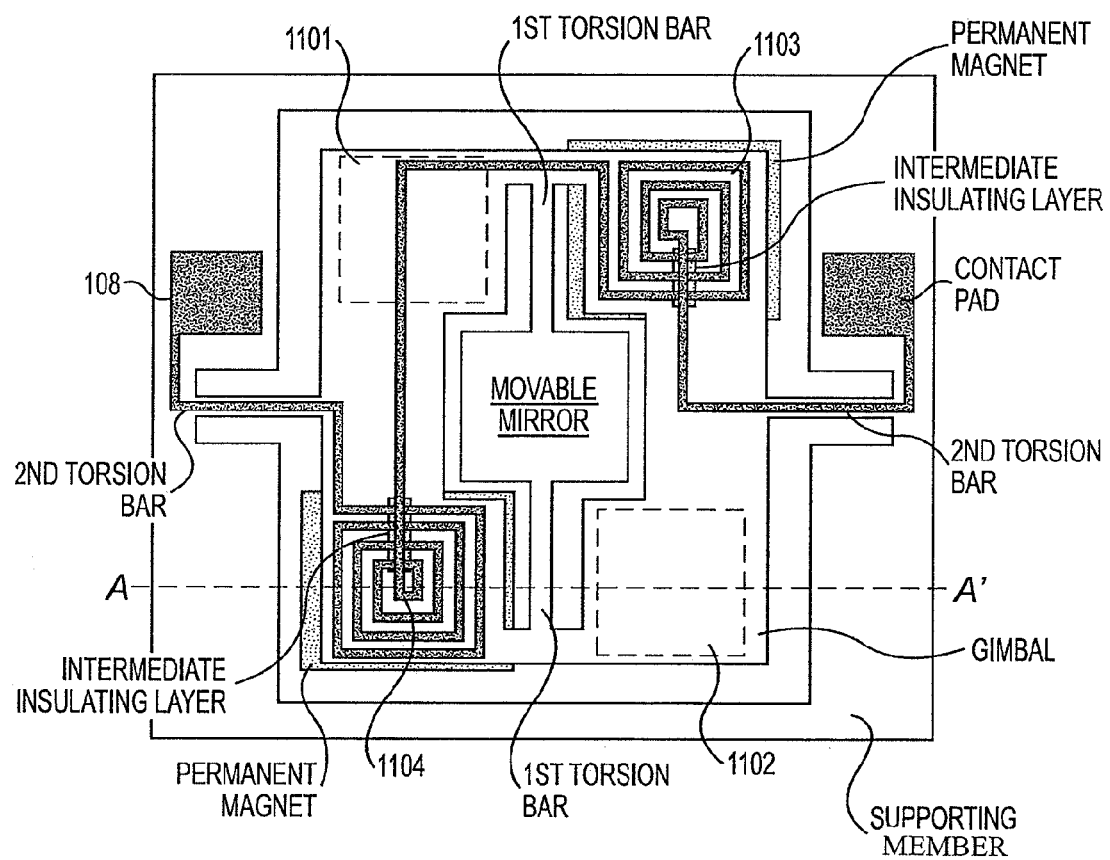
FIG. 18 is a top plan view showing an example of an optical deflector according to a fifth embodiment of the present invention.
Figure 19:
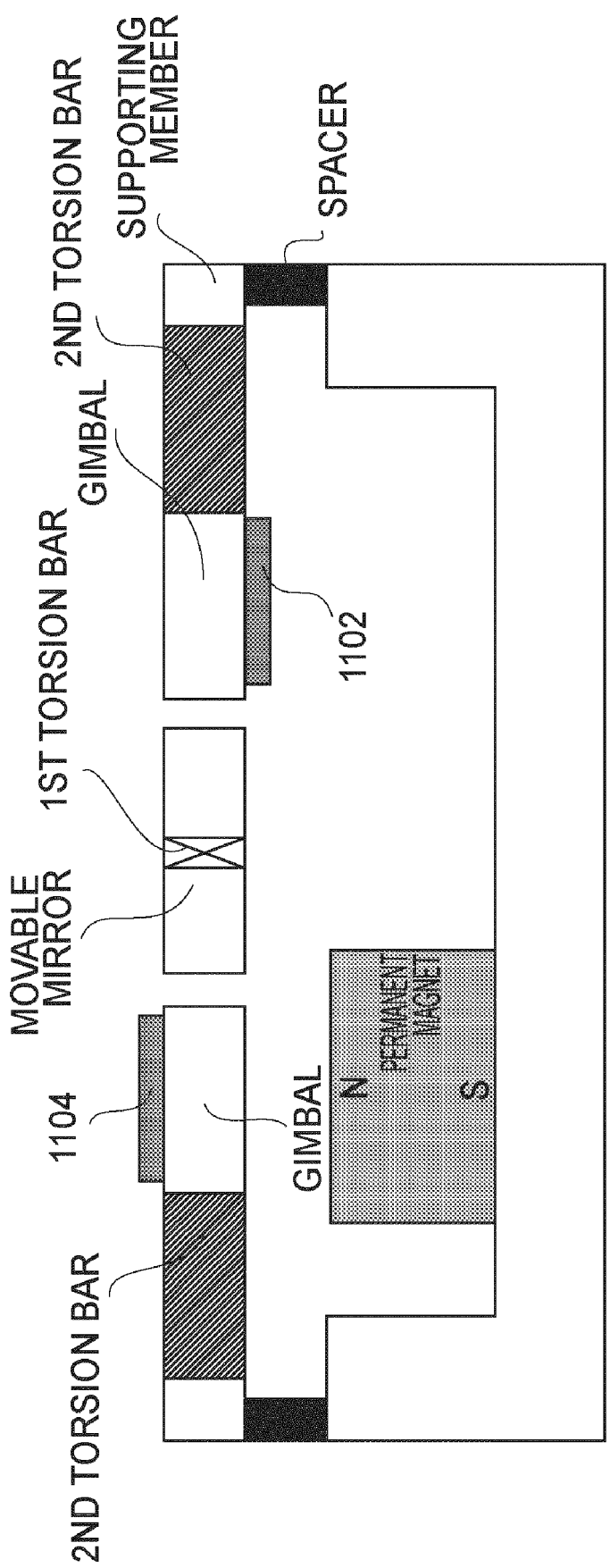
FIG. 19 is a sectional view of the optical deflector according to the fifth embodiment of the present invention.
Figure 20A:
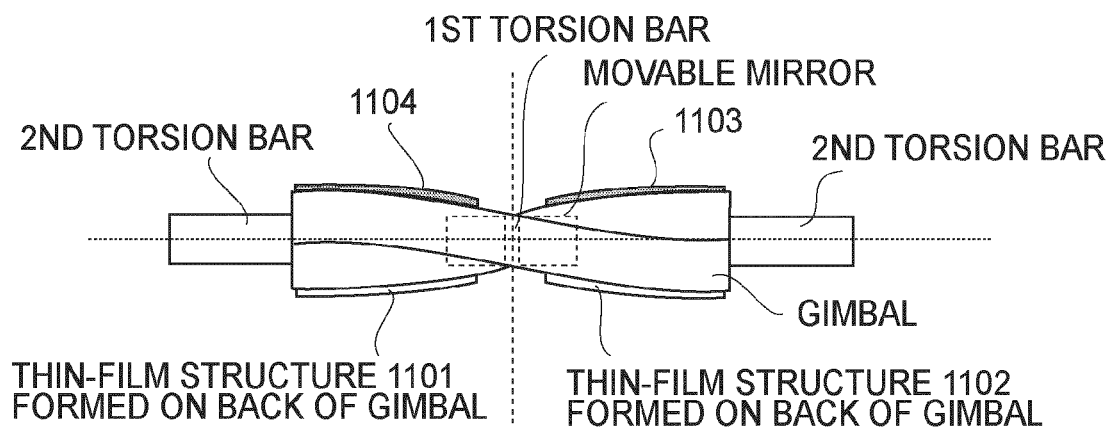
FIG. 20A and FIG. 20B are diagrams for explaining the operation and working-effect of the fifth embodiment of the optical deflector of the present invention.
Figure 20B:
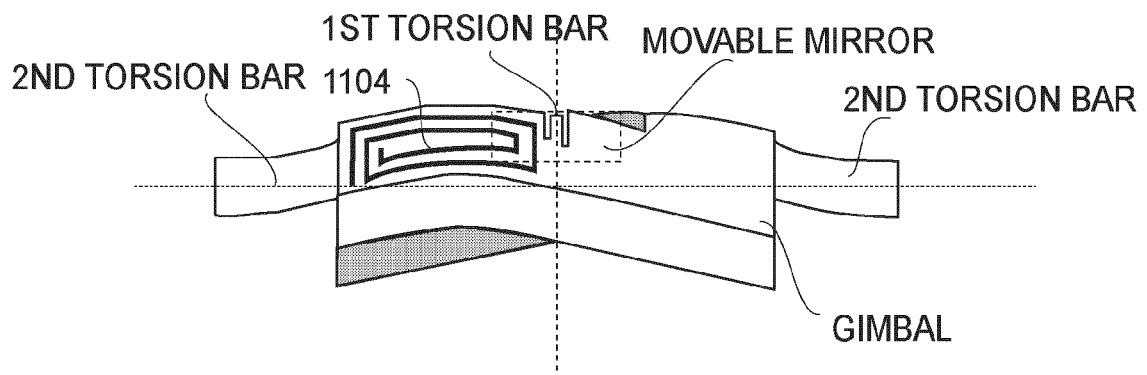

In this embodiment, an optical deflector having a gimbals structure shown in FIG. 18 and FIG. 19 was designed and manufactured. The present embodiment has a feature that thin film structures 1101 and 1102 are added to the structure having been explained with reference to the first embodiment. FIG. 18 is a top plan view showing the structure of the optical deflector of the present embodiment. FIG. 19 is a sectional view of the optical deflector of FIG. 18, taken along a line A-A'. FIG. 20 is a diagram for explaining advantageous results of the thin film structure. In these figures, reference numerals are not assigned to components other than the coil and the thin film structure.

The structure, except for the thin film structures 1101 and 1102, is the same as that of the first embodiment, and a similar function and advantageous results are provided using a current signal and a driving method explained with reference to the first embodiment.

In this embodiment, the film structures 1101 and 1102 and the electrical coils 1103 and 1104 are made of the same material, and they have approximately the same shapes. Thus, residual stress and thermal expansion deformation produced with respect to the gimbals at the time of formation are the same. More specifically, in order to provide sufficient advantageous results to be described below, the film structures 1101 and 1102 are made of the same material as that of the electrical coils 1103 and 1104, and they have a shape of a coil. The gimbals can be made from monocrystal silicon having good thermal conduction performance. Thus, when heat is generated by applying an electrical current to the electrical coils 1103 and 1104, the electrical coils, gimbals and film structures will have approximately the same temperature. Furthermore, the electrical coils 1103 and 1104 are formed on the top surface of the gimbals, whereas the film structures 1101 and 1102 are formed on the bottom surface of the gimbals. Furthermore, the electrical coils 1103 and 1104 and the film structures 1101 and 1102 are localized at diagonal positions in zones quartered by the extension lines of the first and second torsion bars.

In the disposition example of the electrical coils and film structures described above, the following advantageous results will be provided.

(1) The flexure due to the residual stress produced at the time of formation between the coil and gimbals, and the flexure due to the residual stress produced at the time of the formation between the thin-film structure and the gimbals, will cancel each other in the mirror and the first and second torsion bars. Hence, no flexure will be produced.

(2) The thermal expansion deformation produced between the gimbals and the coil due to the heat generated by applying an electrical current to the coil, and the thermal expansion deformation produced between the thin-film structure and the gimbals will cancel each other, and no flexure will be produced.

With this arrangement, the position of the rotational axis based on the first and second torsion bars do not change, and good surface flatness of the mirror is maintained. This is shown in FIG. 20A.

Figure 22:
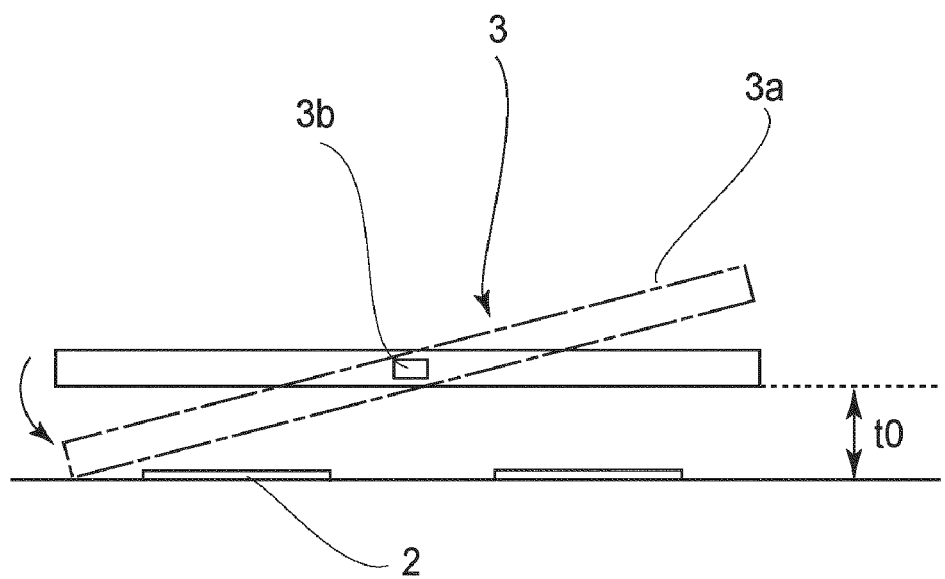
FIG. 22 is a diagram showing an example of a conventional structure.
Figure 23:
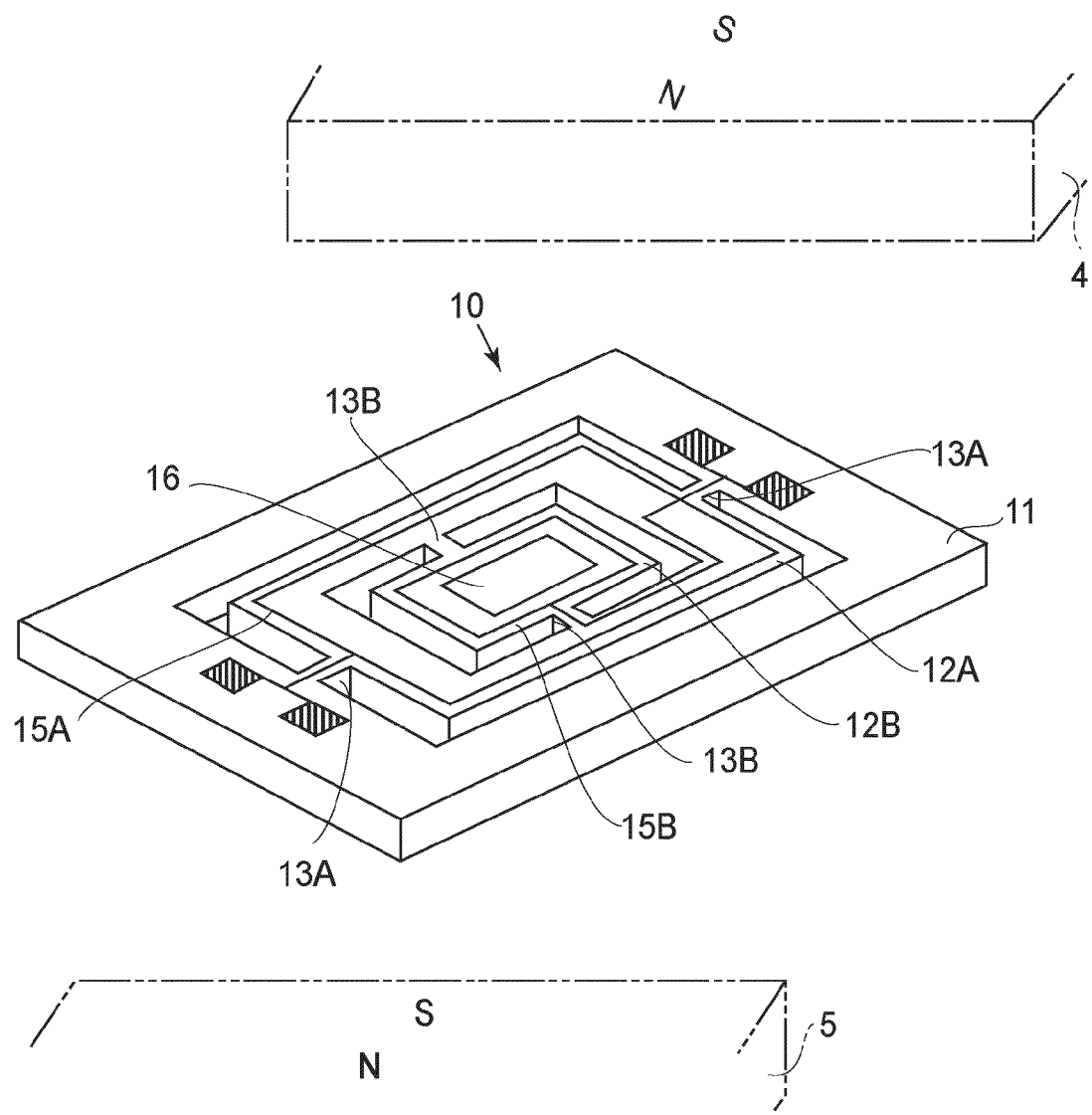
FIG. 23 is a diagram showing another example of a conventional structure.

By advantageous results (1) and (2), angular displacement of the mirror in a desired manner about the rotational axis of the first and second torsion bars is enabled, and a two-dimensional scan of the light beam by the movable mirror can be done very precisely. As compared therewith, if the film structures 1101 and 1102 are not provided, because of the residual stress and thermal expansion deformation the mirror and the first and second torsion bars will produce flexure, as shown in FIG. 22B.

Embodiment 6

Figure 21:
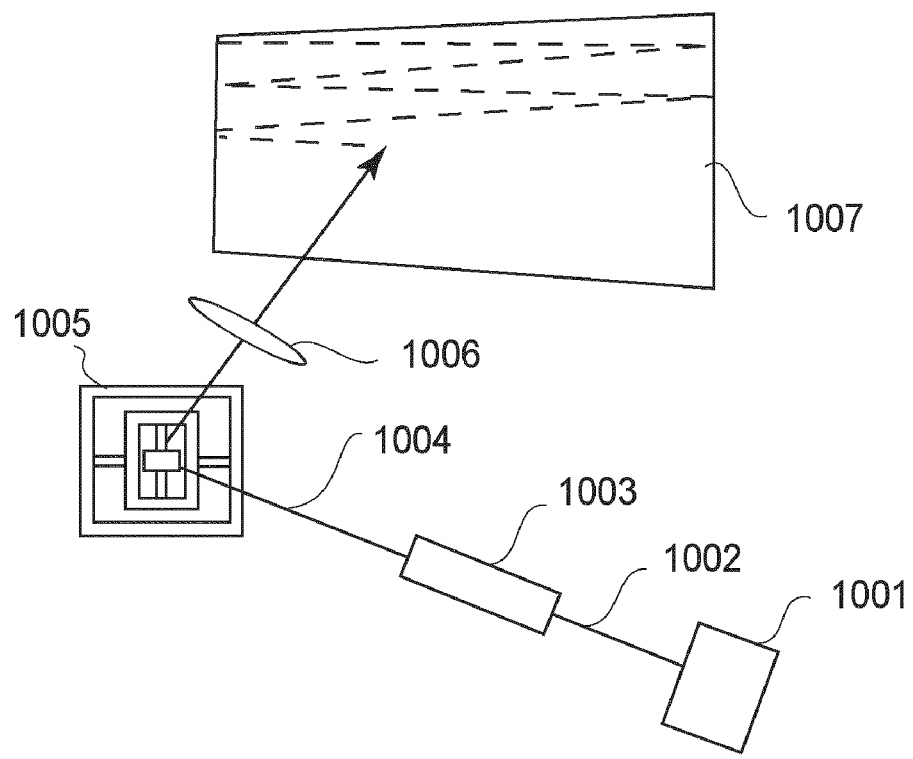
FIG. 21 is a diagram showing an example of an image display unit using an optical deflector of the present invention.

A sixth embodiment of the present invention is an example of an image display unit, which is a visual display unit, using an optical deflector of the present invention. FIG. 21 shows the structure of the present embodiment. In the image display unit of the present embodiment, a direct modulation light source 1003 is modulated on the basis of a modulating signal 1002 outputted form a light source modulation driving member 1001. Here, the direct modulation light source 1003 is comprised of a red-color semiconductor laser. The direct modulation light source 1003 may use a light source configured to directly modulate red, blue and green colors, which may be mixed by using a color mixture optical system. The output light 1004 directly modulated by the direct modulation light source 1003 is projected on the reflection surface of an optical deflector 1005. The reflected light being deflected by optical deflector 1005 goes through a correction optical system 1006, and it is displayed as an image on an image display 1007. The correction optical system 1006 is an optical system for correcting distortion of an image due to the resonance scan.

The optical deflector 1005 is an optical deflector according to any one of the preceding embodiments. Based on raster scanning of the output light 1004 using the optical deflector 1005, an image can be displayed on the image display 1007, which is the surface to be irradiated with light.

As described above, an image display unit of this embodiment, which has a compact structure, is arranged so that light from a light source is deflected by a compact oscillator device of the present invention, and at least a portion of the light is incident on the surface to be irradiated. Furthermore, an image display unit, which can be driven with a low voltage and which enables a large deflection angle and a high-definition image, is accomplished.

While the invention has been described with reference to the structures disclosed herein, it is not confined to the details set forth, and this application is intended to cover such modifications or changes as may come within the purposes of the improvements or the scope of the following claims.

What is claimed is:

1. An oscillator device, comprising:
   a first oscillator;
   a second oscillator configured to support said first oscillator for torsional rotation about a first rotational axis, through a first torsion spring;
   a supporting member configured to support said second oscillator for torsional rotation about a second rotational axis, through a second torsion spring, the second rotational axis having a predetermined angle with respect to the first rotational axis of said first oscillator;
   a first coil disposed in relation to said second oscillator;

an electric current applying member configured to apply an electric current to said first coil; and a magnetic field generating member configured to apply a magnetic field to said first coil, wherein said first coil is localized in at least one of zones of said second oscillator being quartered by extension lines of the first and second rotational axes.

2. An oscillator device according to claim 1, further comprising a second coil, wherein said first coil and said second coil are disposed in a pair of zones of the quartered zones, respectively, and are in a diagonal positional relationship with each other.

3. An oscillator device according to claim 2, further comprising two thin-film structures, wherein said first coil and said second coil are disposed on one of the surfaces of said second oscillator, and wherein said two thin-film structures are provided on the other surface of said second oscillator and are localized in another pair of zones, other than the zones where said first coil and second coil are provided, in a diagonal positional relationship with each other.

4. An oscillator device according to claim 1, wherein said oscillator device further comprises a second coil, a third coil, and a fourth coil, wherein said first and second coils are disposed in a pair of zones of the quartered zones in a diagonal positional relationship with each other, and wherein said third and fourth coils are disposed in another pair of zones in a diagonal positional relationship with each other.

5. An oscillator device according to claim 4, wherein said first and second coils are electrically connected to each other, and wherein said third and fourth coils are electrically connected to each other.

6. An oscillator device according to claim 1, wherein said magnetic field producing member includes a permanent magnet.

7. An oscillator device according to claim 1, wherein an electric current signal includes a first driving current signal arranged to torsionally rotate said first oscillator relative to said second oscillator, and a second driving current signal arranged to torsionally rotate said second oscillator relative to said supporting member.

8. An optical deflector, comprising:
an oscillator device as recited in claim 1; and
a light deflecting element provided on said first oscillator of said oscillating device.

9. An image display device, comprising:
a light source;
an optical deflector as recited in claim 8; and
a surface to be irradiated with light,
wherein light from said light source is deflected by said oscillator device and at least a portion of the deflected light is incident on the surface to be irradiated.

10. A method of driving an oscillator device as recited in claim 4, using an electric current signal comprised of a first driving current signal of a periodic signal having a first frequency adapted to torsionally rotate said first oscillator relative to said second oscillator, and a second driving current signal of a periodic signal having a second frequency adapted to torsionally rotate said second oscillator relative to said supporting member, comprising the step of:
applying electric currents to said first, second, third, and fourth coils in the manner that an amount of electric current change of said first, second, third, and fourth coils in response to the first driving current signal is the same and it is taken as a first current change amount, while the amount of electric current change of said first, second, third, and fourth coils in response to the second driving current signal is the same and it is taken as a second current change amount, and that the amount of electric current change of said first and second coils is taken as an addition of the first current change amount and the second current change amount, while the amount of electric current change of said third and fourth coils is taken as a subtraction of the first current change amount and the second current change amount.

* * * * *